(12) United States Patent
Bain et al.

(10) Patent No.: US 7,860,965 B1
(45) Date of Patent: Dec. 28, 2010

(54) SYSTEM AND METHOD FOR NETWORK TRAFFIC AND I/O TRANSACTION MONITORING OF A HIGH SPEED COMMUNICATIONS NETWORK

(75) Inventors: Lawrence Michael Bain, Mt. View, CA (US); Kenneth R. Hornyak, San Jose, CA (US); Steven Ronald Klotz, Austin, TX (US); Jason David Mann, Austin, TX (US); Henry David Poelstra, Ottawa (CA); Robert Witherow Otis, San Jose, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 1235 days.

(21) Appl. No.: 10/424,363

(22) Filed: Apr. 25, 2003

Related U.S. Application Data

(60) Provisional application No. 60/375,511, filed on Apr. 25, 2002.

(51) Int. Cl.
*G06F 15/173* (2006.01)
(52) U.S. Cl. .................. 709/224; 709/223; 709/248
(58) Field of Classification Search .................. 709/224
See application file for complete search history.

(56) References Cited

U.S. PATENT DOCUMENTS

| | | | |
|---|---|---|---|
| 4,769,761 A * | 9/1988 | Downes et al. ............... | 709/224 |
| 5,243,543 A * | 9/1993 | Notess ....................... | 709/224 |
| 5,600,632 A * | 2/1997 | Schulman .................... | 370/252 |
| 5,689,688 A * | 11/1997 | Strong et al. ................. | 713/375 |
| 5,694,615 A * | 12/1997 | Thapar et al. .................. | 710/2 |

(Continued)

FOREIGN PATENT DOCUMENTS

WO    WO 02/052400 A1    7/2002

OTHER PUBLICATIONS

Web page: Internetweek.com, Schultz, Keith, *A Complete Solution, Enterasys Networks proves its mettle in enterprise-class switching*, Jan. 22, 2001.

(Continued)

*Primary Examiner*—Asad M Nawaz
*Assistant Examiner*—Christopher Biagini
(74) *Attorney, Agent, or Firm*—Matthew A. Pequignot; Pequignot + Myers LLC

(57) ABSTRACT

A network monitoring architecture and methodology enabling performance detection and diagnostics in storage area networks or other networks. The network monitoring is performed using a three-tiered distributed computing system architecture, including a data source tier, a portal tier and a client tier. The data source tier monitors the physical data on the network medium using multiple data collection sources, or data probes, connected to the network. The probes analyze network data and generate metrics that describe attributes of the network data. The metrics are synchronized in time by virtue of time stamps associated with the data monitored by the data probes. The time-synchronized metrics are used by the data portal tier, which is the second tier of the system. The portal tier encapsulates the metrics into data containers. The data containers may be requested by the client tier, which is the third tier in the network monitoring system. The client tier provides a user interface for displaying various types of network information derived from the contents of data containers.

20 Claims, 17 Drawing Sheets

U.S. PATENT DOCUMENTS

| | | | |
|---|---|---|---|
| 5,696,701 | A | 12/1997 | Burgess et al. |
| 5,761,424 | A | 6/1998 | Adams et al. |
| 5,812,529 | A | 9/1998 | Czarnik et al. |
| 5,886,643 | A | 3/1999 | Diebboll et al. |
| 5,905,868 | A | 5/1999 | Baghai et al. |
| 5,958,009 | A * | 9/1999 | Friedrich et al. ............ 709/224 |
| 6,014,707 | A | 1/2000 | Miller et al. |
| 6,023,507 | A * | 2/2000 | Wookey .................... 709/224 |
| 6,041,352 | A * | 3/2000 | Burdick et al. .............. 709/224 |
| 6,098,157 | A | 8/2000 | Hsu et al. |
| 6,108,782 | A * | 8/2000 | Fletcher et al. ............. 713/153 |
| 6,157,955 | A * | 12/2000 | Narad et al. ................. 709/228 |
| 6,269,330 | B1 * | 7/2001 | Cidon et al. .................. 714/43 |
| 6,308,280 | B1 * | 10/2001 | Joseph et al. .............. 713/400 |
| 6,321,255 | B1 | 11/2001 | May et al. |
| 6,327,620 | B1 * | 12/2001 | Tams et al. .................. 709/224 |
| 6,335,931 | B1 | 1/2002 | Strong et al. |
| 6,385,636 | B1 | 5/2002 | Suzuki |
| 6,421,723 | B1 * | 7/2002 | Tawil .......................... 709/224 |
| 6,446,111 | B1 | 9/2002 | Lowery |
| 6,456,594 | B1 | 9/2002 | Kaplan et al. |
| 6,459,682 | B1 | 10/2002 | Ellesson et al. |
| 6,519,568 | B1 * | 2/2003 | Harvey et al. .................. 705/1 |
| 6,522,205 | B2 * | 2/2003 | Kallio et al. ................. 331/1 R |
| 6,522,268 | B2 | 2/2003 | Belu |
| 6,625,648 | B1 * | 9/2003 | Schwaller et al. ........... 709/224 |
| 6,639,607 | B1 | 10/2003 | Ferguson et al. |
| 6,639,957 | B2 * | 10/2003 | Cahill-O'Brien et al. .... 375/354 |
| 6,651,099 | B1 | 11/2003 | Dietz et al. |
| 6,658,025 | B2 * | 12/2003 | Mauritz et al. .............. 370/507 |
| 6,704,284 | B1 | 3/2004 | Stevenson et al. |
| 6,708,292 | B1 | 3/2004 | Mangasarian |
| 6,785,237 | B1 | 8/2004 | Sufleta |
| 6,904,020 | B1 | 6/2005 | Love et al. |
| 6,925,052 | B1 | 8/2005 | Reynolds et al. |
| 6,975,592 | B1 | 12/2005 | Seddigh et al. |
| 6,976,062 | B1 | 12/2005 | Denby et al. |
| 7,124,180 | B1 * | 10/2006 | Ranous ....................... 709/224 |
| 7,151,966 | B1 | 12/2006 | Baier et al. |
| 7,193,968 | B1 | 3/2007 | Kapoor et al. |
| 2001/0022823 | A1 * | 9/2001 | Renaud ....................... 375/359 |
| 2002/0026475 | A1 | 2/2002 | Marmor |
| 2002/0191649 | A1 | 12/2002 | Woodring |

OTHER PUBLICATIONS

Office Action mailed Jan. 12, 2007, U.S. Appl. No. 10/307,272.
Office Action mailed Jun. 26, 2007, U.S. Appl. No. 10/307,272.
Final Office Action mailed Jan. 15, 2008, U.S. Appl. No. 10/307,272.
Office Action mailed May 11, 2007, U.S. Appl. No. 10/424,361.
Final Office Action mailed Feb. 28, 2008, U.S. Appl. No. 10/424,361.
Office Action mailed Jun. 5, 2007, U.S. Appl. No. 10/424,364.
Office Action mailed Jun. 11, 2007, U.S. Appl. No. 10/424,367.
Final Office Action mailed Jan. 23, 2008, U.S. Appl. No. 10/424,367.
Final Office Action mailed May 14, 2008, U.S. Appl. No. 10/424,364.
Office Action mailed Jul. 15, 2008, U.S. Appl. No. 10/424,367.
Office Action mailed Jul. 25, 2008, U.S. Appl. No. 10/424,361.
Final Office Action mailed Dec. 3, 2008, U.S. Appl. No. 10/424,367.
Office Action mailed Dec. 16, 2008, U.S. Appl. No. 10/307,272.
Final Office Action mailed Dec. 18, 2008, U.S. Appl. No. 10/424,361.
Office Action mailed Dec. 3, 2008, U.S. Appl. No. 10/424,364.
Notice of Allowance mailed May 20, 2009, U.S. Appl. No. 10/307,272.

* cited by examiner

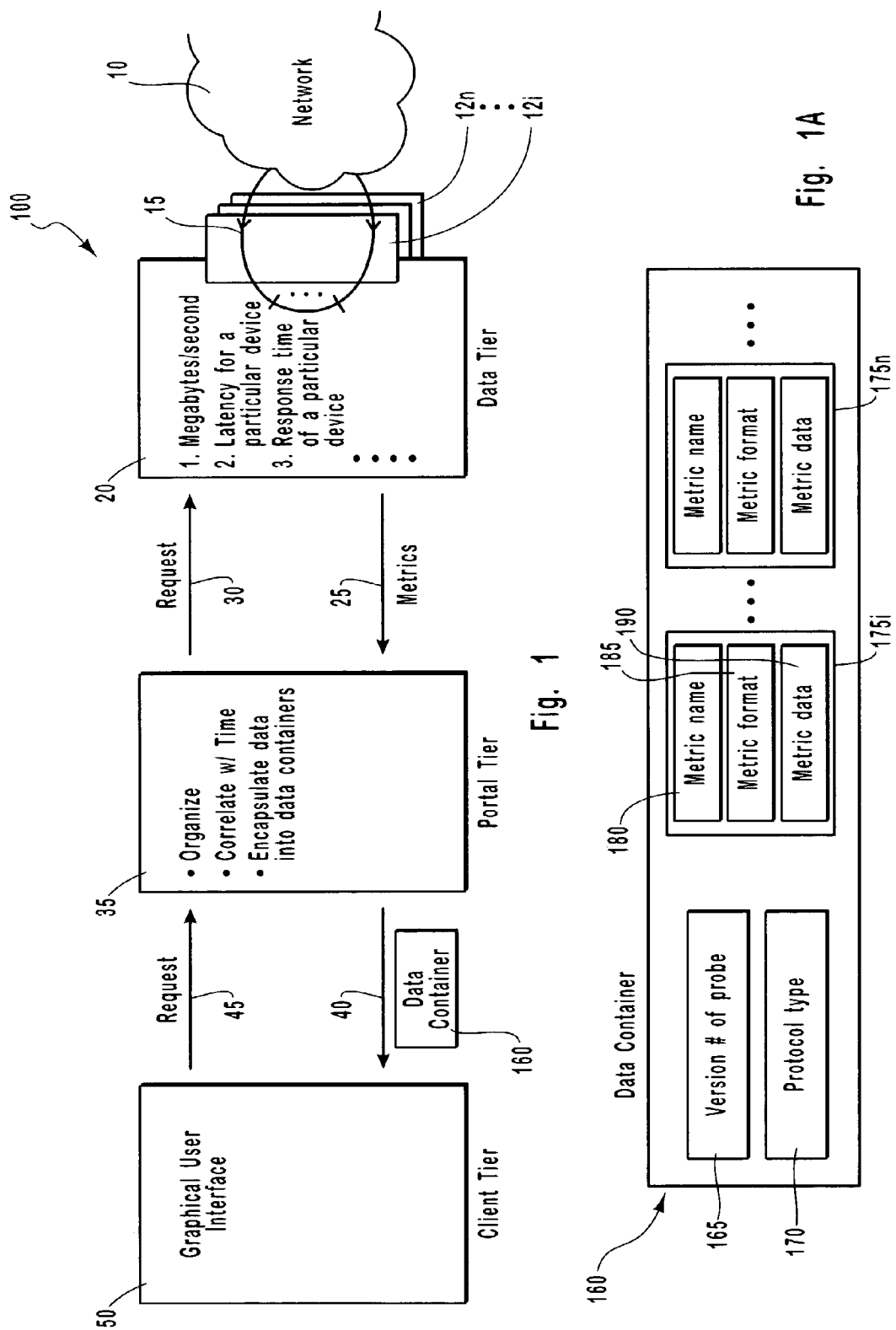

An intermittent device
problem becomes visible
once SCSI end-device
conversations are monitored.

This problem would be lost
in the overall link traffic if
only aggregate link statistics
are monitored (MB/s, etc).

| Initiator | Avg Read ECT | Min Read ECT | Max Read ECT | Avg Write ECT | Min Write ECT | Max Write ECT | Avg Other ECT | Min |
|---|---|---|---|---|---|---|---|---|
| 0x20f200 | 8.087 | 0.000 | 24.261 | 28.061 | 0.000 | 84.184 | 8.815 | |
| 0x2b0100 | 104.871 | 104.871 | 104.871 | 0.000 | 0.000 | 0.000 | 0.000 | |
| 0x201c00 | 24.468 | 0.000 | 87.110 | 10.863 | 0.000 | 43.453 | 13.620 | |
| 0x3e1d00 | 9.629 | 0.000 | 28.888 | 77.820 | 56.049 | 96.326 | 0.000 | |

SYSTEM AND METHOD FOR NETWORK TRAFFIC AND I/O TRANSACTION MONITORING OF A HIGH SPEED COMMUNICATIONS NETWORK

RELATED APPLICATION INFORMATION

This application claims priority to and the benefit of U.S. Provisional Application Ser. No. 60/375,511, filed Apr. 25, 2002 and entitled "System and Method For Network Traffic and I/O Transaction Monitoring of a High Speed Communications Network." That application is incorporated herein by reference in its entirety. The application also relates to co-pending U.S. patent application Ser. No. 10/307,272, filed Nov. 27, 2002 and entitled "A System and Method For Network Traffic and I/O Transaction Monitoring of a High Speed Communications Network." That application is incorporated herein by reference in its entirety.

BACKGROUND OF THE INVENTION

1. The Field of the Invention This invention relates generally to the field of high speed communications systems and networks. More particularly, embodiments of the present invention relate to systems and methods for analysis and processing of network traffic attributes, such as storage I/O transaction specific attributes in a Storage Area Network (SAN).

2. The Relevant Technology

Computer and data communications networks continue to proliferate due to declining costs, increasing performance of computer and networking equipment, and increasing demand for communication bandwidth. Communications networks—including wide area networks ("WANs") and local area networks ("LANs")—allow increased productivity and utilization of distributed computers or stations through the sharing of resources, the transfer of voice and data, and the processing of voice, data and related information at the most efficient locations. Moreover, as organizations have recognized the economic benefits of using communications networks, network applications such as electronic mail, remote host access, distributed databases and digital voice communications are increasingly used as a means to increase user productivity. This increased demand, together with the growing number of distributed computing resources, has resulted in a rapid expansion of the number of installed networks.

As the demand for networks has grown, network technology has grown to include many different communication protocols and physical configurations. Examples include Ethernet, Token Ring, Fiber Distributed Data Interface ("FDDI"), Fibre Channel, and InfiniBand networks. These and the many other types of networks that have been developed typically utilize different cabling systems, different communication protocols, provide different bandwidths, and typically transmit data at different speeds.

The recent availability of low cost, high speed network technologies has also given rise to new uses of networks in specific application areas. One such example is referred to as a Storage Area Network (SAN). A SAN is a network whose primary purpose is the transfer of data between computer systems and data storage devices, and among data storage devices, based on protocols developed specifically for data storage operations. SANs have expanded from simple replacements for directly connected storage I/O buses that connect small numbers of storage devices across short distances to a single computer, to complex switched networks that connect hundreds or thousands of computing and data storage end-devices. Moreover, SANs are now being connected to even larger scale metropolitan area networks (MANs) and wide area networks (WANs) that extend the distances of SAN networks into thousands of miles.

High speed networks can be very efficient at utilizing the network bandwidth to transfer large amounts of data. However, the growing complexity and spanned distances of SAN networks can adversely impact the performance experienced by the individual storage I/O operations that transit the network. Therefore, as SAN networks continue to grow it is important to monitor the communication performance of the specific storage I/O transactions between the various end-devices to ensure that adequate performance levels are maintained. Additionally, the same techniques can be utilized to monitor for device errors that may adversely impact overall network efficiency and forewarn of individual device failures.

Existing network monitoring methods, especially those for a SAN, have not been entirely satisfactory in providing a satisfactory level of monitoring, analysis and troubleshooting capabilities. Consequently, network managers often do not have a sufficient level of information about the operating parameters of a network, and therefore are not able to fully monitor and optimize the network's operation.

For example, conventional methods typically only monitor network traffic at the aggregate flow level for a particular network link. In other words, only the communication throughput is measured at a particular location within the network. Throughput is a measurement of how much data is being sent between two adjacent nodes in the network. Unfortunately, the throughput parameter provides only limited information about the communication performance experienced by individual end-device transactions within the network. For example, in a SAN environment a high throughput does not necessarily mean that each storage I/O request is being transferred in the most expedient manner possible. In a SAN, storage I/O operations are composed of request/response/completion-status sequences of network traffic primitives to form an atomic "Storage I/O Transaction." Client application performance can be highly impacted by attributes of these individual storage I/O transactions. For example, attributes such as transaction latency and number of retries can be highly relevant in analyzing SAN performance. It has been shown that in a shared storage I/O channel or network environment, I/O transaction latency commonly deteriorates exponentially as aggregate throughput increases. (see FIG. 7). Therefore, a very high traffic throughput is not necessarily an indicator of good network performance because this will often mean that an undesirable amount of I/O transaction latency is occurring in the system. Since conventional networking monitoring systems do not monitor the individual attributes of storage I/O transactions, they do not provide the requisite level of information for understanding a given network's operational status.

Another drawback of existing methods for monitoring high speed networks—such as a SAN—is the inability to provide a global upgrade to all monitoring devices used by the monitoring system. Network monitoring systems typically use some form of monitoring device (sometimes referred to as a "probe") that is directly or indirectly inserted into one of the data channels located within the network. This monitor can then obtain information about the data that is being transferred at that particular network location, which is then provided to a single host device. To do so, each monitoring device must be specifically configured to operate in the environment of the network to which it is connected. Thus, when the communication protocol of the high speed network is upgraded, then all of the monitoring devices must also be replaced or the hardware must be upgraded in a like manner. Such a scenario is not uncommon. For example, many network storage devices in a SAN use the SCSI protocol to transfer data. In the future, updated versions of SCSI or even new transfer protocols likely will be adopted, which will require updates to any monitoring devices. The requirement for such a "global" upgrade is time consuming and expensive, and is difficult to provide with conventional monitoring systems.

Existing monitoring systems also suffer from another related problem. In particular, conventional monitoring systems do not support monitoring environments having multiple probes that are monitoring different network protocols. Instead, each of the probes must be configured for a single particular protocol type. This greatly reduces the ability to accurately monitor the operating conditions of a typical network implementation. For example, today's SANs are increasingly implemented as inter-connections of network segments that are using different protocols. As such, it is important to be able to compare traffic activity on a segment using one protocol, with traffic activity on another segment that is using a different protocol (e.g., Fibre Channel on one segment and Ethernet on another segment).

Conventional systems suffer from a closely related problem as well. In particular, conventional monitoring systems require that each monitoring device be configured in the same way as all other monitoring devices in the system so that the information being obtained is provided in a uniform and consistent manner to the monitoring system. Thus, when the software version of one device is upgraded, then all of the monitoring devices must also be upgraded in a like manner. For example, when a new network monitoring device is introduced that contains a different software version, the other monitoring devices must also be globally upgraded so as to insure proper operation. Again, such global upgrades of this sort are demanding of time and resources and are expensive.

The use of network monitoring devices gives rise to other problems as well. For example, as networks—such as SANs—increase in size, it is becoming more important to record network information at multiple locations within the network to accurately monitor the network operating status. To do so, multiple monitoring devices must be connected throughout the network at various locations. To fully utilize this multiple probe system, the data provided by each probe should be comparable to the data provided from the other probes. This introduces a new obstacle of synchronizing the multiple data sources in order to accurately compare and contrast the efficiency of different parts of the network at a given point in time. Many new networks, such as optical networks, operate at a very high rates of speed. Thus, a network monitoring synchronization scheme must have the capacity to keep up with each network monitor to prevent individual monitors from drifting further and further out of synchronization from the others. In addition, the network monitoring synchronization scheme must continuously ensure that all of the network monitoring data from one monitoring device is properly synchronized with the network monitoring data from the other monitoring devices.

High network speeds create other problems as well. In particular, as networking speeds continue to advance, it becomes more and more difficult for networking monitoring devices to obtain information in real time. In particular, existing monitoring devices are not able to monitor Gigabit-rate network traffic at full line rate speeds. Consequently, network "conditions" can often be missed, and such systems are thus unable to monitor all network characteristics accurately.

Therefore, there is a need for an improved network monitoring system. Preferably, the monitoring system should be capable of obtaining the attributes of individual network transactions occurring within the network, such as attributes of I/O transactions occurring within a SAN continuously and in real time at full line rate speeds. In this way, the system would be able to monitor network operating parameters other than just raw throughput, and instead could identify and monitor the individual device transactions within the data communications network so that errors and latencies can be accurately monitored and attributed to the individual devices involved. In addition, an improved monitoring system should be capable of monitoring transaction level communications from multiple locations within the network, and in a manner so that the data obtained from the multiple locations is synchronized in time. Further, it would be an advancement in the art to provide a network monitoring system that is capable of receiving and processing data received from multiple heterogeneous monitoring devices—e.g., different types of monitoring devices, that are monitoring different protocols or running different software versions, etc. The system should optimize the amount of computational resources used to obtain attributes of network transactions, and in a manner that does not sacrifice the available number of network characteristics that can be viewed by a user, such as a network manager. Further, it would be an improvement if the network monitoring system could operate in the context of very high speed networks—including gigabit operating speeds.

SUMMARY OF EMBODIMENTS OF THE INVENTION

These and other problems in the prior art are addressed by embodiments of the present invention, which generally relates to systems and methods for implementing a network monitoring system that provides a number of features and advantages not currently available in conventional network monitoring solutions. In particular, the present invention provides a network monitoring architecture and methodology that enables network performance tuning, early detection of network problems, and diagnostic assistance for problems in the network, among other capabilities. While the teachings of the present invention will find applicability in a wide variety of network environments, protocols and applications, embodiments of the invention are especially well suited for specialized, high speed networking environments—including those operating at transmission speeds in excess of one Gigabit per second. For example, embodiments of the present invention provide an ideal monitoring environment for accurately monitoring the actual behavior of computer secondary storage I/O traffic over complex serial storage networks, otherwise known as Storage Area Networks (SANs). In addition, the architecture used by embodiments of the present monitoring system provides the capability to correlate measurements from multiple points taken simultaneously within a large distributed network environment.

By way of summary, preferred embodiments of network monitoring system are premised on a three-tiered distributed computing system architecture. The three distinct tiers of the network monitoring system are referred to as a data source tier, a portal tier and a client tier.

The data source tier is the functional component that is responsible for actually monitoring the physical data present on the network medium. Preferably, the data source tier is comprised of a plurality of data collection sources, otherwise referred to as "data probes," which are connected (either directly or indirectly) to the network. Each of these data probes monitor the physical data present on the network medium and, in a preferred embodiment, generate discrete intervals of data. The probes then analyze these data intervals, and identify specific "attributes" of the network data. These attributes can be certain characteristic or statistic information that relates to the monitored network data. These attributes are generated in the form of "metrics," which are discrete data units. For example, in a SAN environment, each metric is "storage I/O" centric, and contain attributes of multi-interval storage I/O transactions between devices on the network. In addition, they may contain attributes of instantaneous events that may occur on the network. In preferred embodiments, metrics are generated at the data probes in substantially real time; that is, the probes are able to continuously generate metric information about the network traffic as fast as the traffic occurs within the network. In a SAN environment, this can exceed Gigabit per second traffic rates.

Once metrics are generated at individual data collection probes, they are forwarded to the next tier in the network system—the data portal tier. The portal tier is preferably implemented in software on a host computing device, and generally provides the function of collection, management and reformatting of the metric data collected from each of the data probes, which are each connected to the portal. In preferred embodiments, the portal tier manages the metric data by encapsulating metric data received from a probe into a data structure referred to as a "data container." This data container has a predefined format, and organizes the metric data in accordance with the type of attributes contained in the metrics.

Once generated at the portal tier, data containers may be requested by the third tier in the network monitoring system—the client tier. The client tier, which is also preferably implemented in software on a host computing device, provides a user interface that can be used by a user to selectively display various types of network information that is derived from the contents of data containers that are received from the portal tier. Preferably, the interface is a graphics-based interface, which allows a variety of graphical views of different network operating characteristics.

In yet another embodiment, the metric data that is obtained by different probes within a network is synchronized in time. In this way, the metric data can be correlated with time so as to generate accurate monitoring data for the client tier. In one embodiment, this functionality is provided by marking each metric collected by a probe with a "time-stamp." This time-stamp is then synchronized with respect to time-stamps for all other metrics from all other probes operating within the network. In this way, operating behavior of one portion of the network can be observed and compared with respect to the operating behavior of a different portion of the network and in the same time frame.

The presently disclosed network monitoring system and method provides a number of advantages over existing systems. In particular, the architecture and methodology provides the ability to obtain relevant network data in substantially real time. Moreover, the architecture allows for the collection of network data from various locations throughout the network, and yet does so in a way that the data can be easily viewed and compared by a user. Moreover, the data collected is synchronized in time so as to provide the administrator with a more realistic and relevant view of the network operating characteristics This allows network administrators and integrators to resolve network problems and bottlenecks so that the full performance benefits of the network can be realized. While the approach can be used in connection with many high speed network environments, it is especially well suited for a transaction-based network, such as a SAN.

These and other features of the present invention will become more fully apparent from the following description and appended claims, or may be learned by the practice of the invention as set forth hereinafter.

BRIEF DESCRIPTION OF THE DRAWINGS

A more particular description of the current invention will be made by making reference to specific embodiments of the invention, which are illustrated in the appended drawings. These drawings depict only example embodiments of the invention and are not to be considered limiting of its scope. The invention will be described and explained with additional specificity and detail through the use of the accompanying drawings, in which:

FIG. 1 illustrates a functional block diagram showing one presently preferred method for transaction level monitoring of a high speed communications network, such as a storage area network (SAN);

FIG. 1A illustrates a diagram of one presently preferred data container structure for use with the method of transaction monitoring illustrated in FIG. 1;

FIGS. 10-14 illustrate additional various examples of presently preferred embodiments of user interfaces provided at a client tier of a exemplary monitoring system.

DESCRIPTION OF THE PREFERRED EMBODIMENTS

Figure 1B:
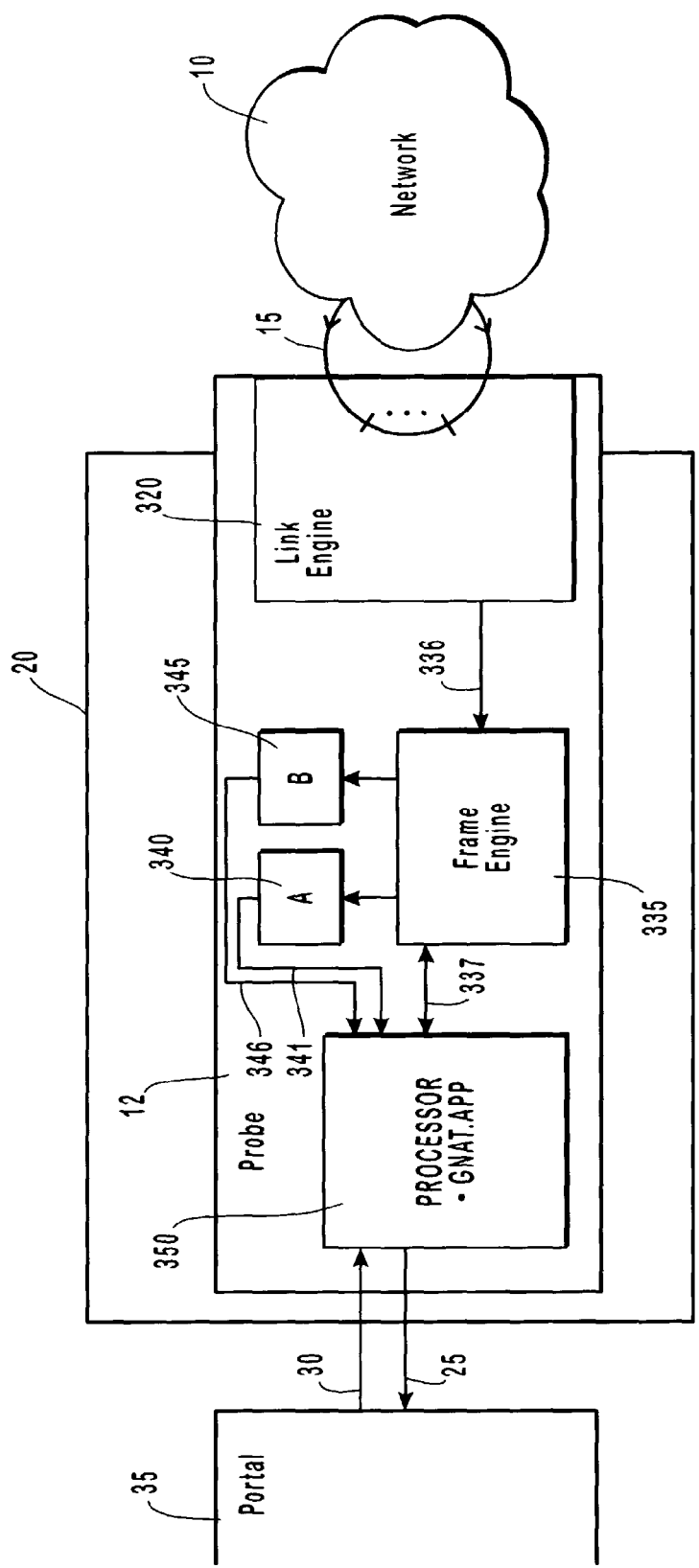
FIG. 1B illustrates a block diagram of a network monitoring device, or "probe," that can be used in conjunction with the method of transaction monitoring of FIG. 1.

The present invention provides systems and methods for implementing a network monitoring system that provides a number of features and advantages not currently available in conventional network monitoring solutions. For example, the present invention provides a network monitoring environment that enables network performance tuning, early detection of network problems, and diagnostic assistance for problems in the network, among other capabilities. Moreover, embodiments of the invention are especially suited for specialized, high speed networking environments—including those in excess of one Gigabit per second. For example, disclosed embodiments provide an exemplary monitoring environment that accurately monitors the actual behavior of complex and high speed network traffic, such as computer secondary storage I/O traffic over complex serial storage networks, otherwise know as Storage Area Networks (SANS). Further, embodiments of the disclosed monitoring systems provide the capability to correlate measurements from multiple points taken simultaneously within a large distributed network environment. Finally, preferred embodiments of the invention provide such levels of functionality in a manner that minimizes disruption on a deployed monitoring environment; for example, the need for continuous probe hardware upgrades and software updates is greatly reduced.

For purposes of illustration and description, embodiments of the present invention are described in the context of a particular networking environment—a storage area network (SAN). However, it will be appreciated that the teachings of the present invention are equally applicable to other applications and networking environments as well. Similarly, the invention is not limited to any particular network or physical protocol; indeed, SAN network protocol technology itself is undergoing constant evolution, including Fibre Channel, iSCSI over Ethernet, FCIP over Ethernet, Infiniband, etc. Moreover, while illustrated embodiments may be described or implied as being implemented in the context of an optical-based network, it will be appreciated that the present invention is equally applicable to non-optics based networks, such as shielded electrical cables, etc.

I. The Overall Network Monitoring System

In general, a preferred embodiment of the overall network monitoring system is implemented with three distinct tiers of functional components within a distributed computing and networking system. These three tiers of the network monitoring system, which is designated generally at 100 in FIG. 1, are referred to herein as a data source tier 20, a portal tier 35 and a client tier 50. The data source tier 20 is preferably comprised of multiple sources for network traffic measurements at various points within the network, shown as 10 in FIG. 1. The portal tier 35 is a middle tier within the hierarchy, and generally provides the function of collection, management and reformatting of the measurement data collected at the data source tier 20 as well as management of the entities that perform the role of the data source tier. Finally, the top level tier—referred to as the client tier 50—is preferably comprised of software implemented clients that provide visualizations of the network traffic monitored at the data source tier 20. Optionally, the client tier 50 also provides additional ancillary processing of the monitored data.

Following is a more detailed description of one presently preferred implementation of the three tiers used in the current monitoring system 100.

A. The Data Source Tier

The data source tier 20 is comprised of one or more sources for network traffic measurements that are collected at one or more points in the network topology, designated at 10. A primary functional requirement of the data source tier 20 is that it continuously monitor all of the network traffic traversing each network point being monitored, and produce a numeric descriptive summary (referred to herein as a "metric") for all of the network traffic within the particular monitoring interval. As is indicated at schematic line 25, each metric is then passed to the next tier in the overall system 100, the portal tier 35, which is described below. In the example embodiment (i.e., a SAN environment) these descriptive metrics are "storage I/O" centric; that is, they contain attributes of multi-interval storage I/O transactions between devices, as well as instantaneous events. Storage I/O transaction metrics can include, for example, attributes such as latency for transactions directed to a particular storage device; response times for a particular device; block transfer sizes; completion status of a transfer; and others. Instantaneous event attributes can include, for example, certain types of errors and non-transaction related information such as aggregate throughput (e.g., megabytes/second).

In a presently preferred embodiment, the multiple sources used to measure network traffic are referred to herein as "probes," designated at 12 in FIG. 1 As noted, these probes are inserted into the network 10 at different locations to produce specific information about the particular data flow, one example of which is represented at 15, at the given network connection point. Again, attributes of the monitored data are identified and placed in the form of a metric by the probe. Thus, each probe is implemented to generate metrics that characterize and/or represent the instantaneous events and storage I/O transactions that are monitored. Often, and depending on the type of attribute involved, multiple storage I/O transactions must be observed and analyzed before a particular metric can be constructed.

The probes 12 are preferably implemented so as to be capable of monitoring the network data flow 15 and generating the corresponding metric(s) in substantially real time. Said differently, the probes are able to continuously generate metrics about the traffic as fast as the traffic occurs within the network 10, even at Gigabit traffic rates and greater. Again, in the exemplary embodiment, the network 10 is implemented as a high speed SAN that is operating in excess of one Gigabit per second.

In an alternative embodiment, a passive optical tap can be disposed between the network medium and the probe device. The passive tap is then used to feed a copy of the data flow 15 directly into the probe. One advantage of incorporating a passive optical tap is that if the probe malfunctions for any reason, the data flow 15 within the network 10 is not affected. In contrast, if a probe is used directly "in-line," there is a potential for data interruption if the probes malfunctions. Also, when connected via a passive tap, the probes do not become identified devices within the network 10, but are merely inserted to calculate and measure metrics about the data flow 15 wherever they are located.

It will be appreciated that a number of probe implementations could be used. However, in general, the probe provides several general functions. First, each probe includes a means for optically (if applicable), electrically and physically interfacing with the corresponding network 10, so as to be capable of receiving a corresponding data flow. In addition, each probe 12 includes a high speed network processing circuit that is capable of receiving a data flow 15 from the network and then processing the data flow 15 so as to generate a corresponding metric or metrics. In particular, the high speed processing circuit must be able to provide such functionality in substantially real time with the corresponding network speed. The probe may further include a separate programmable device, such as a microprocessor, that provides, for example, the functional interface between the high speed processing circuit and the portal tier 35. The programmable device would, for example, handle the forwarding of the metric(s) at the request of the portal tier. It may also format the metrics in a predefined manner, and include additional information regarding the probe for further processing by the portal tier, as will be described in further detail below. It will be appreciated that the above functionality of the high speed processing circuit and the separate programmable device could also be provided by a single programmable device, provided that the device can provide the functionality at the speeds required.

By way of example and not limitation, one presently preferred probe implementation is shown in FIG. 1B, to which reference is now made. The probe 12 generally includes a link engine circuit, designated at 320, that is interconnected with a high speed, network traffic processor circuit, or "frame engine" 335. In general, the frame engine 335 is configured to be capable of monitoring intervals of data 15 on the network, and then processing and generating metric(s) containing attributes of the monitored data. While other implementations could be used, in a presently preferred embodiment, this frame engine 335 is implemented in accordance with the teachings disclosed in pending U.S. application (Ser. No. 09/976,756, filed Oct. 12, 2001), entitled "Synchronous Network Traffic Processor" and assigned to the same entity as the present application. That application is incorporated herein by reference in its entirety.

Also included in probe 12 is programmable processor, such as an embedded processor 350, which has a corresponding software storage area and related memory. The processor 350 may be comprised of a single board computer with an embedded operating system, as well as hardware embedded processing logic to provide various functions. Also, associated with processor 350 is appropriate interface circuitry (not shown) and software for providing a control interface (at 337) and data interfaces (at 341 and 346) with the frame engine 335, as well as a data and control interface with the portal tier 35 (at 30 and 25). In a preferred embodiment, the processor 350 executes application software for providing, among other functions, the interface functionality with the frame engine 335, as well as with the portal tier 35. One presently preferred implementation of this embedded application software is referred to herein, and represented in FIG. 1B, as the "GNAT.APP."

The link engine 320 portion of the probe 12 preferably provides several functions. First, it includes a network interface portion that provides an interface with the corresponding network 10 so as to permit receipt of the interval data 15. In addition, the link engine 320 receives the data stream interval 15 and restructures the data into a format more easily read by the frame engine logic 335 portion of the probe 12. For example, the link engine 320 drops redundant or useless network information present within the data interval and that is not needed by the frame engine to generate metrics. This insures maximum processing efficiency by the probe 12 circuitry and especially the frame engine circuit 335. In addition, the link engine can be configured to provide additional "physical layer"-type functions. For example, it can inform the frame engine when a "link-level" event has occurred. This would include, for example, an occurrence on the network that is not contained within actual network traffic. For example, if a laser fails and stops transmitting a light signal on the network, i.e., a "Loss of Signal" event, there is no network traffic, which could not be detected by the frame engine. However, the condition can be detected by the link engine, and communicated to the frame engine.

The data flow interval obtained by the link engine is then forwarded to the frame engine 335 in substantially real time as is schematically indicated at 336. The interval data is then further analyzed by the frame engine 335, which creates at least one descriptive metric. Alternatively, multiple data intervals are used to generate a metric, depending on the particular attribute(s) involved.

As noted, one primary function of the probe is to monitor the interval data 15, and generate corresponding metric data in substantially real time, i.e., at substantially the same speed as the network data is occurring on the network 10. Thus, there may be additional functionality provided to increase the overall data throughput of the probe. For example, in the illustrated embodiment, there is associated with the frame engine logic 335 a first data storage bank A 340 and a second data storage bank B 345, which each provide high speed memory storage buffers. In general, the buffers are used as a means for storing, and then forwarding—at high speeds—metrics generated by the frame engine. For example, in operation the frame engine 335 receives the monitored intervals of network data from the Link Engine 320, and creates at least one metric that includes attribute characteristics of the intervals of data. However, instead of forwarding the created metric(s) directly to the portal tier 35, it is first buffered in one of the data banks A 340 or B 345. To increase the overall throughput, while one data bank outputs its metric contents to the processor 350 (e.g., via interface 341 or 346), the other data bank is being filled with a new set of metric data created by the frame engine 335. This process occurs in predetermined fixed time intervals; for example, in one preferred embodiment the interval is fixed at one second.

Figure 1C:
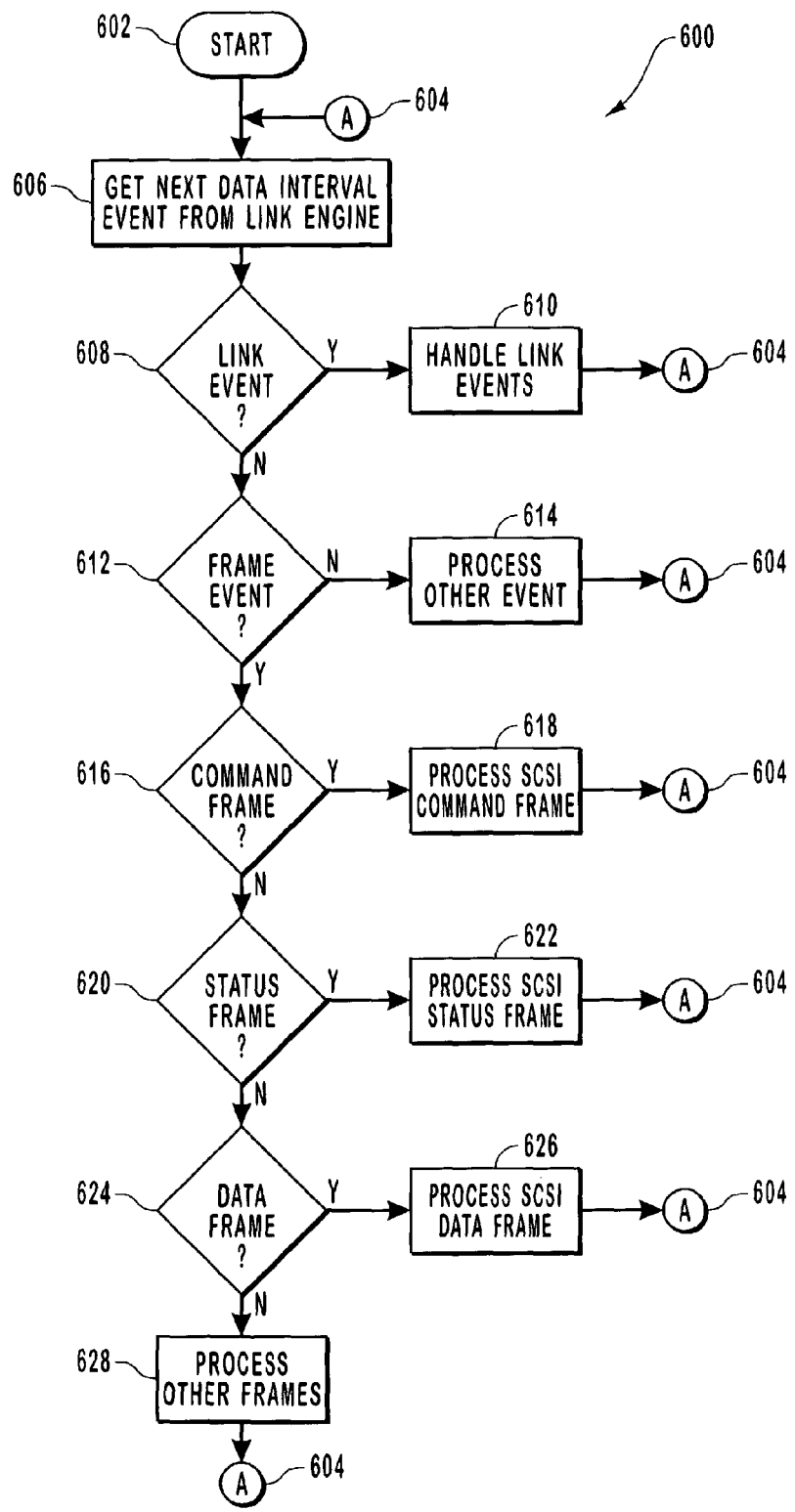
FIG. 1C is a flow chart illustrating one example of a series of computer executable steps that can be used to control the operation of a network monitoring device, such as the probe illustrated in FIG. 1B.

Reference is next made to FIG. 1C, which illustrates a flow chart denoting one example of a methodology, preferably implemented by way of computer executable instructions carried out by the probe's programmable devices, for monitoring network data and deriving metrics therefrom. This particular example is shown in the context of a Fibre Channel network running a SCSI upper level protocol. It will be appreciated however that the embodiment of FIG. 1C is offered by way of example and should not be viewed as limiting the present scope of the invention. Indeed, specific steps may depend on the needs of the particular implementation, the network monitoring requirements, particular protocols being monitored, etc.

Thus, beginning at step 602, a series of initialization steps occurs. For example, the overall probe system is initialized, various memory and registers are cleared or otherwise initialized. In a preferred embodiment, an "exchange table" memory area is cleared. The exchange table is an internal structure that refers to a series of exchange blocks that are used to keep track of, for example, a Fibre Channel exchange (a series of related events). In particular, ITL (Initiator/Target/Lun) exchange statistics (metrics) are generated using the data from this table. Data included within the exchange table may include, for example, target ID, initiator ID, LUN and other information to identify the exchange taking place. Additional data would be used to track, for example, payload bytes transmitted, the time of the command, the location where the data for the ITL is stored for subsequent transmission to the portal tier, and any other information relevant to a particular metric to be generated. Thus, in the present example, when a command is received, the table is created. The first data frame time is recorded, and the number of bytes are added whenever a frame is received. Finally, the status frame is the last event which completes the exchange and updates the table.

Once the requisite initialization has occurred, processing enters an overall loop, where data intervals on the network are monitored. Thus, beginning at program step 606, the next data interval "event" is obtained from the network via the link engine. Once obtained, processing will proceed depending on the type of event the data interval corresponds to.

If at step 608 it is determined that the data interval event corresponds to a "link event," then processing proceeds at step 610. For example, if the link engine detects a "Loss of Signal" event, or similar link level event, that condition is communicated to the frame engine because there is no network traffic present. Processing would then continue at 604 for retrieval of the next data interval event.

If at step 612 it is determined that the data interval event corresponds to an actual network "frame event," then processing proceeds with the series of steps beginning at 616 to first determine what type of frame event has occurred, and then to process the particular frame type accordingly. In the illustrated example, there are three general types of frame types: a command frame; a status frame; and a data frame. Each of these frames contain information that is relevant to the formulation of metric(s). For example, if it is determined that there is a command frame, then processing proceeds at 618, and the SCSI command frame is processed. At that step, various channel command statistics are updated, and data and statistics contained within the exchange table is updated. This information would then be used in the construction of the corresponding metric.

If however, the event corresponds to a status frame at step 620, then processing proceeds with a series of steps corresponding to the processing of a SCSI status frame at step 622. Again, corresponding values and statistics within the exchange table would be updated. Similarly, if the event corresponds to a SCSI data frame, processing proceeds at step 626, where a similar series of steps for updating the exchange table. Note that once a frame event has been identified and appropriately processed, processing returns to step 606 and the next data interval event is obtained.

Of course, implementations may also monitor other frame types. Thus, if the event obtained at step 606 is not a link event, and is not a SCSI frame event, then processing can proceed at step 628 with other frame event types. Processing will then return at step 606 until the monitoring session is complete.

It will be appreciated that FIG. 1C is meant to illustrate only one presently preferred operational mode for the probe, and is not meant to be limiting of the present invention. Other program implementations and operation sequences could also be implemented.

B. The Portal Tier

From a functional standpoint, the portal tier 35 gathers the metrics generated at the data source tier 20, and manages and stores the metric data for later retrieval by the upper client tier 50, which is described below. The portal tier 35 is preferably implemented in a software or firmware based module executing within a programmable device, such as a host computer. During operation, the portal tier 35 forwards a data request, as indicated at 30 in FIG. 1, to a particular data tier 20 via a predefined data interface. The data tier 20 responds by forwarding metric(s), as is indicated at 25, to the portal tier 35.

Once the portal tier 35 has requested and received metrics from a corresponding data tier 20, the portal 35 then organizes the metrics in a predefined manner for either storage, reformatting, and/or immediate delivery to the client tier 50 as "secondary data." Note that the metrics can be stored or otherwise manipulated and formatted into secondary data at the portal tier 35 in any one of a number of ways, depending on the requirements of the particular network monitoring system. For example, if each of the data probes 12i-12n within a given monitoring system provide metrics that have an identical and consistent format, then the metrics could conceivably be passed as secondary data directly to the client tier 50 without any need for reformatting. However, in one presently preferred embodiment, the metric data received from data tier(s) is transformed into secondary data that is encapsulated into a predefined format before it is provided to the client tier 50. In this particular embodiment, the format of the data forwarded to the client tier 50 is in the form of a "data container," designated at 160 in FIG. 1. This particular embodiment is described in further detail below at Section II.

Thus, in the illustrated example, data probes within the data source tier passively monitor traffic within the network (such as link traffic in a SAN). The portal tier then actively "collects" information from the probes, and then provides the client tier with a programmatic interface to integrated views of network activity via the data container.

C. The Client Tier

In general, the client tier, designated at 50 in FIG. 1, is comprised of software components executing on a host device that initiates requests for the secondary data from the portal tier 35. Preferably, the client tier 50 requests information 45 from the portal tier 35 via a defined data communication interface, as is indicated schematically at 45 in FIG. 1. In response, the portal tier 35 provides the secondary data to the client tier 50, as is schematically indicated at 40, also via a defined interface.

Figure 8B:
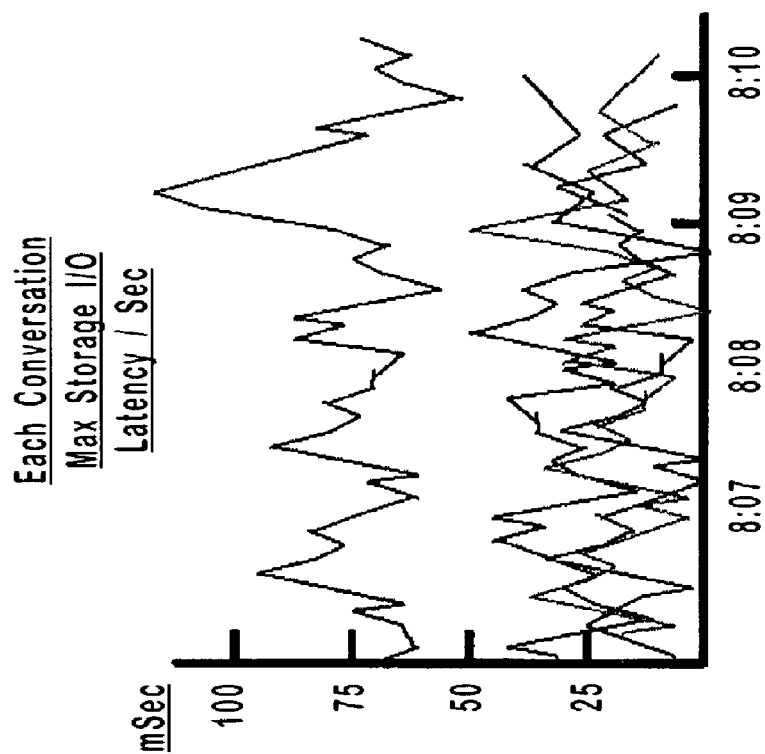
FIG. 8 shows two charts illustrating the value of monitoring storage I/O attributes by individual end-devices when the behavior of one device is significantly worse then all other devices.
Figure 8A:
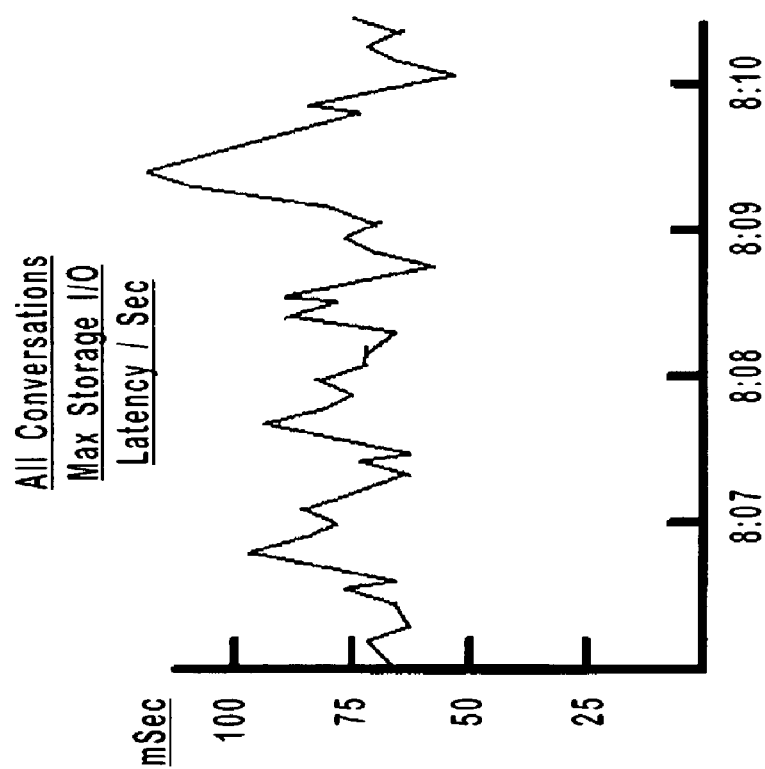
Figure 9:
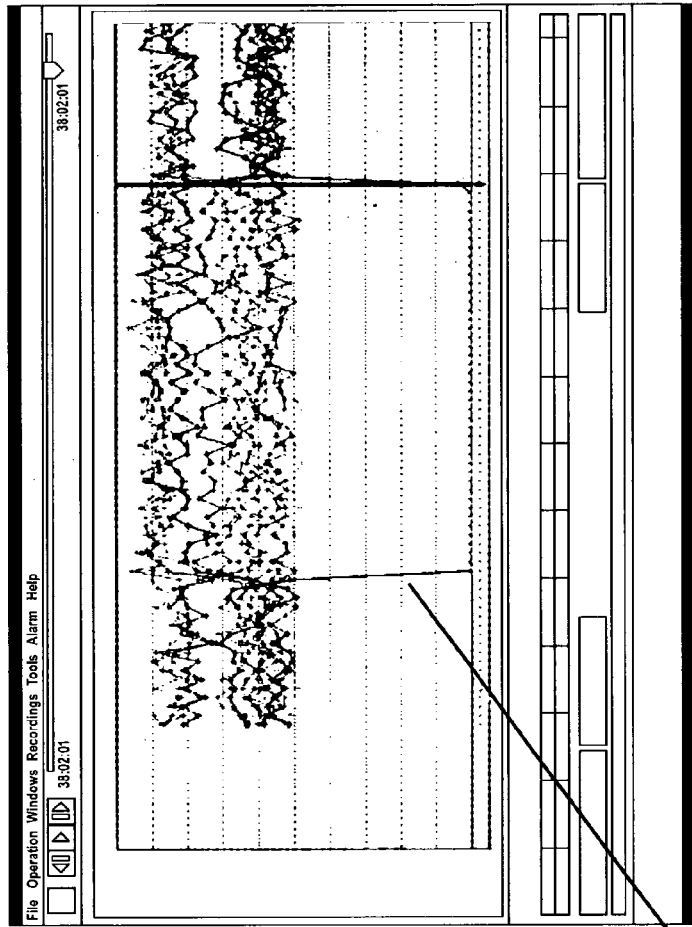
FIG. 9 is illustrates one example of a user interface provided at the client tier, showing statistics that demonstrates the importance of monitoring individual device transaction level attributes in a SAN environment so as to better identify network problems.
Figure 9:
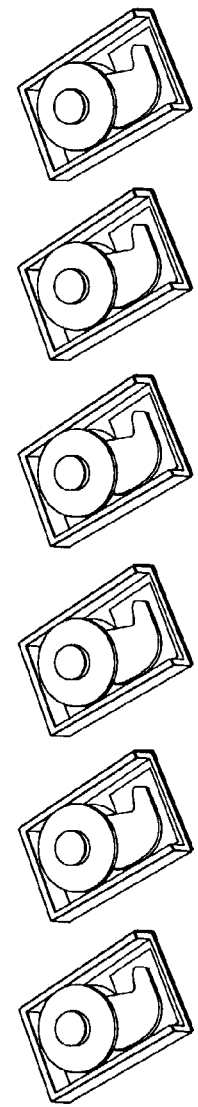
Figure 11:
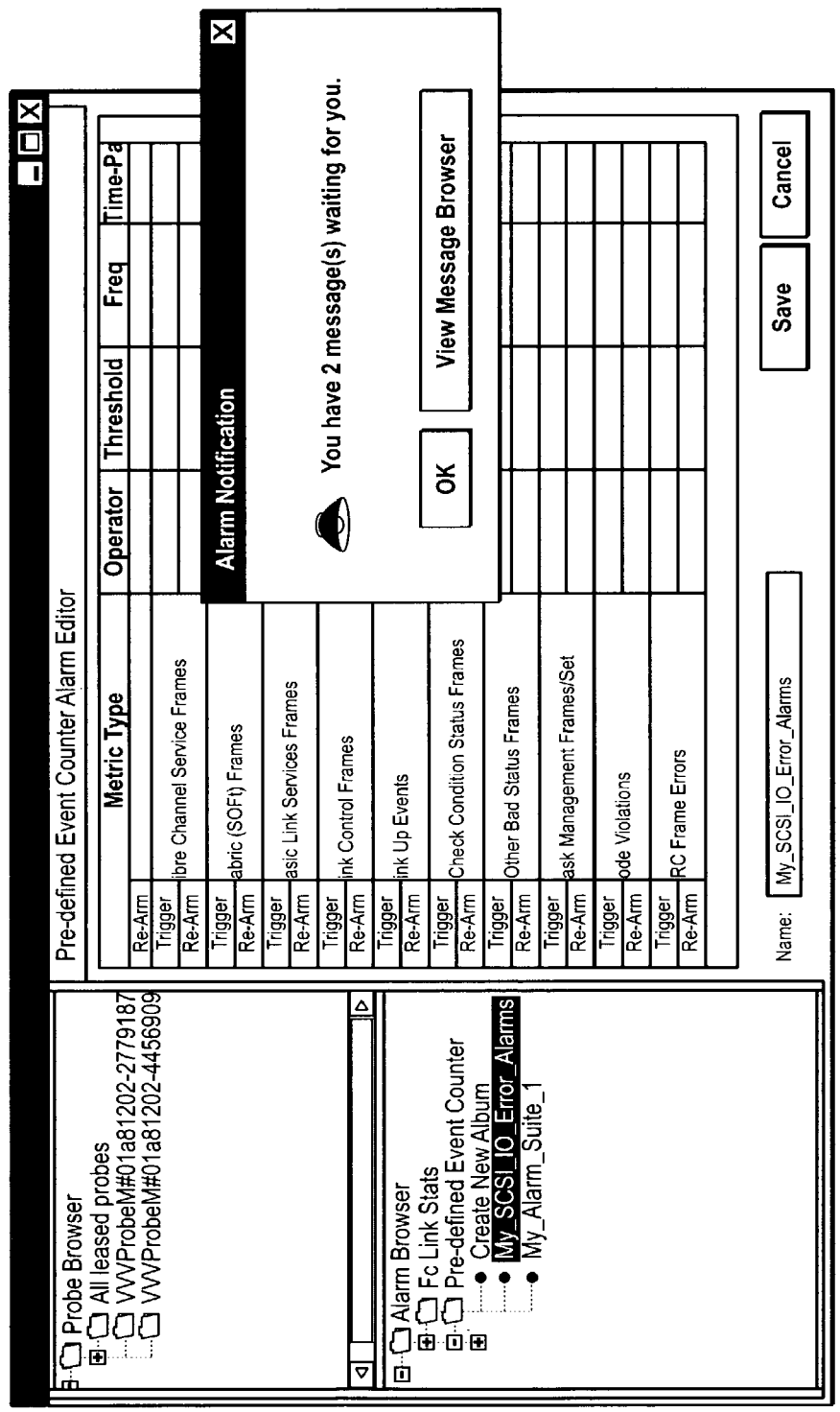
Figure 12:
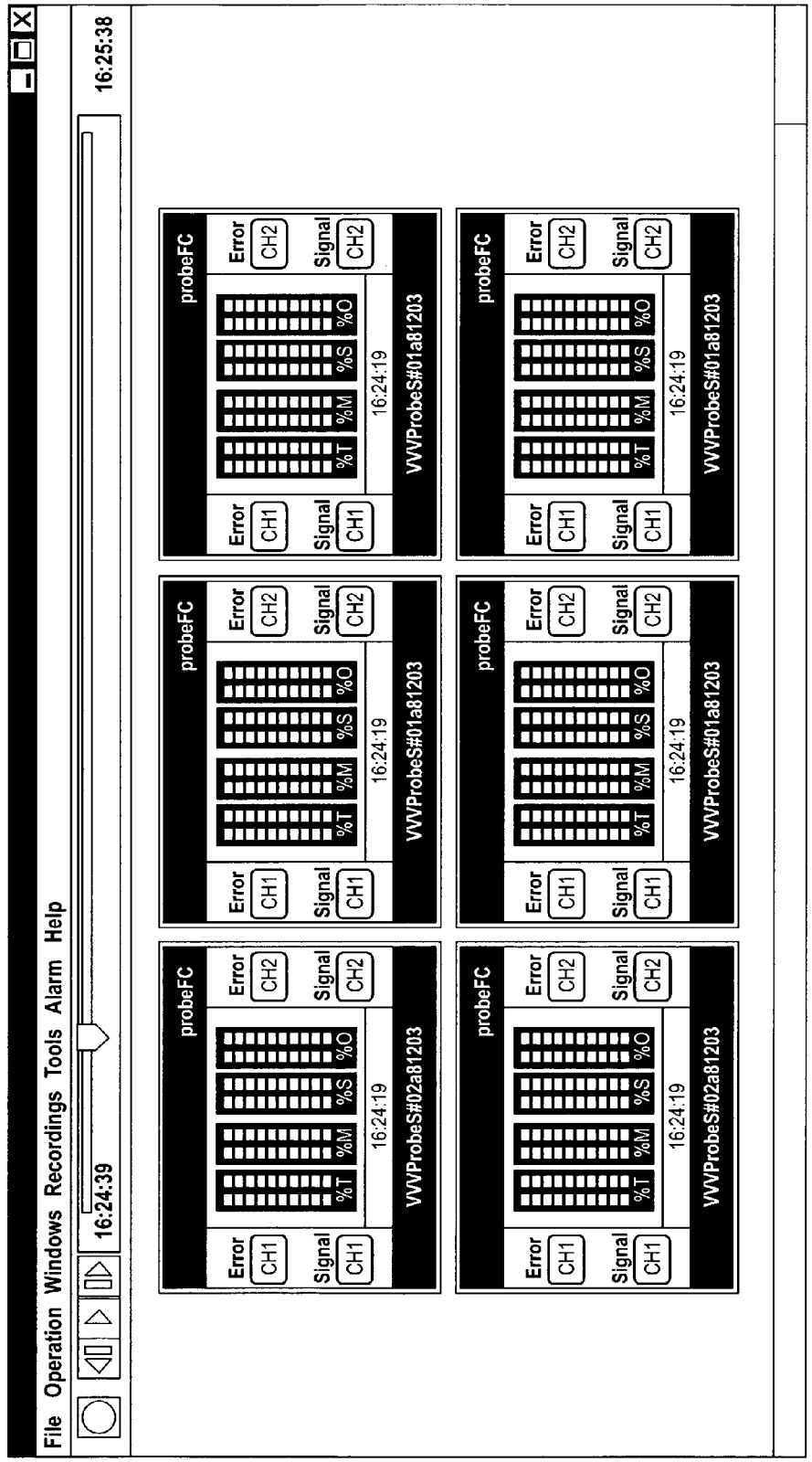
Figure 13:
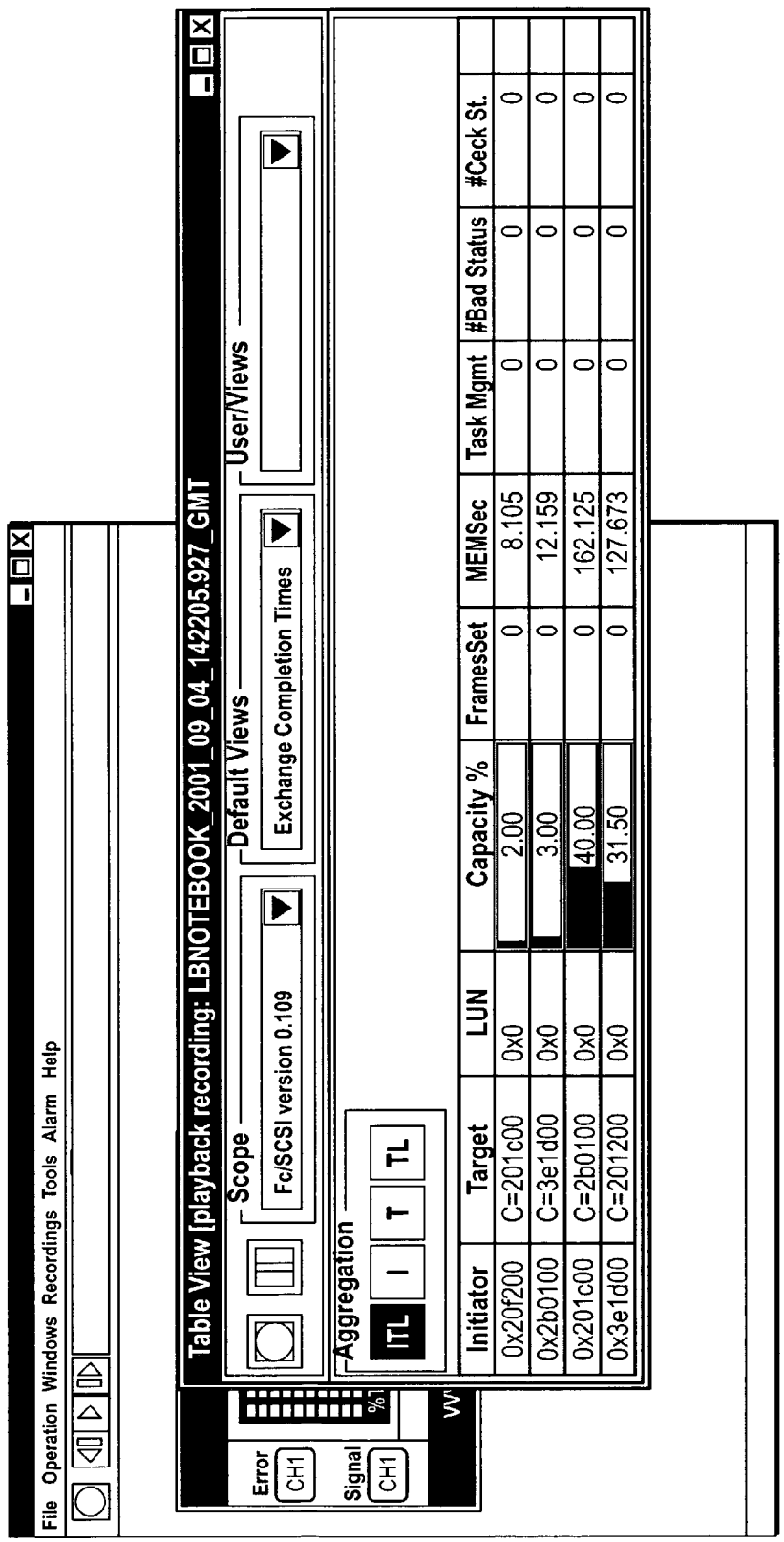
Figure 14:
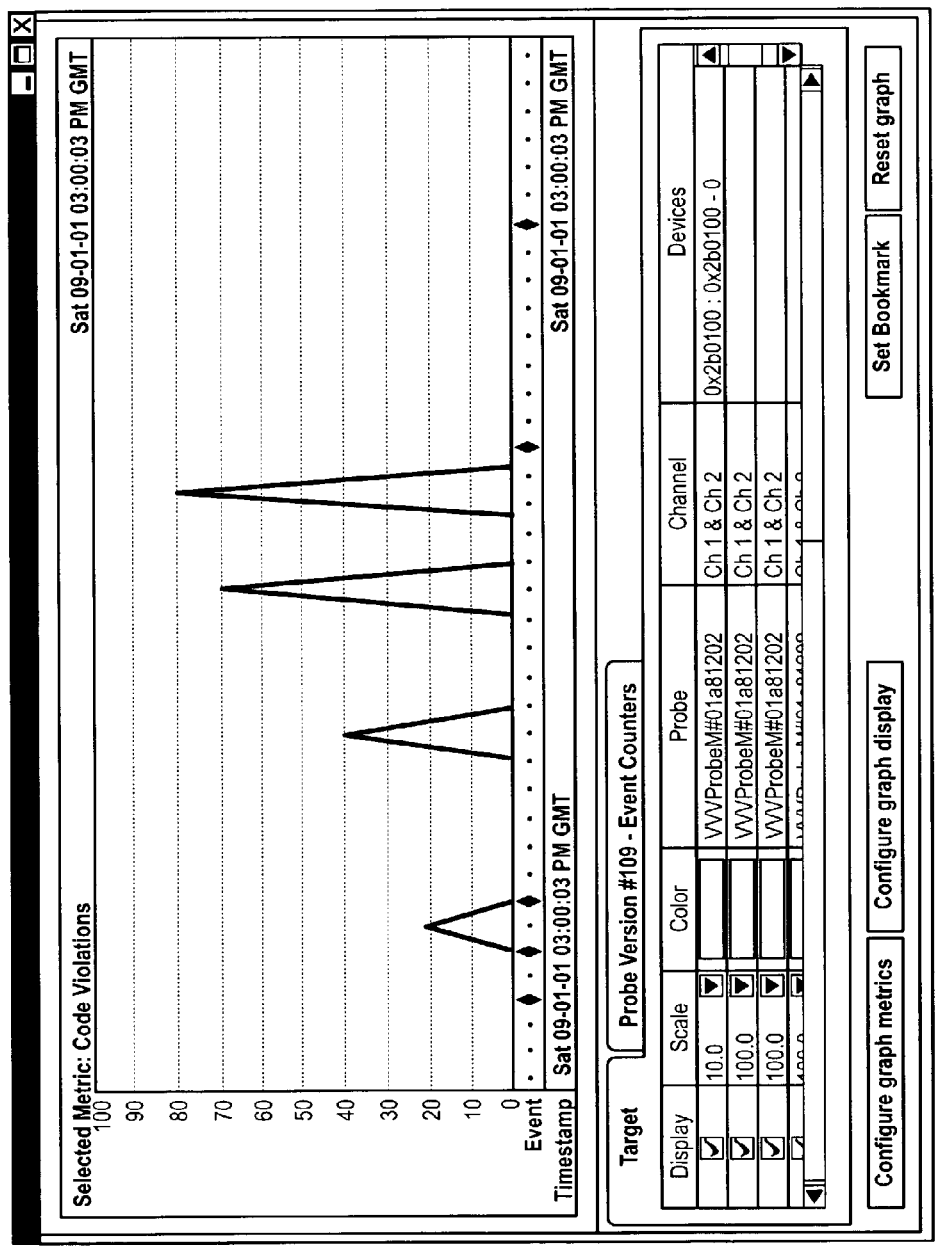

Once secondary data is received, the client tier 50 presents the corresponding information via a suitable interface to human administrators of the network. Preferably, the data is presented in a manner so as to allow the network administrator to easily monitor various transaction specific attributes, as well as instantaneous event attributes, detected within the SAN network at the various monitoring points. By way of example, FIGS. 8-14 illustrate some examples of some of the types of data and network information that can be presented to a user for conveying the results of the transaction monitoring. For example, FIGS. 8 and 9 illustrate a graphical interface showing end-device conversation monitoring using what is referred to as a Client Graph Window. FIG. 10 illustrates a graphical user interface showing real time transaction latency attributes for a particular storage end-device. FIG. 11 is an illustration of an Alarm Configuration window and an Alarm Notification pop-up window, which can be used to alert a user of the occurrence of a pre-defined network condition, for example. FIG. 12 is an illustration of a "Fabric View" window that provides a consolidated view of traffic levels at multiple links within the network. FIG. 13 is an illustration of "instantaneous" attributes of network traffic, per "end-device" conversation within a single monitored link. FIG. 14 is an illustration of a trend analysis of a single traffic attribute over time. It will be appreciated that any one of a number of attributes can be displayed, depending on the needs of the network manager.

In addition to displaying information gleaned from the secondary data, the client tier 50 can also provide additional ancillary functions that assist a network administer in the monitoring of a network. For example, in presently preferred embodiments, the client tier 50 can be implemented to monitor specific metric values and to then trigger alarms when certain values occur. Alternatively, the monitoring and triggering of alarms can occur in the Portal tier, and when the alarm condition occurs, the portal tier sends a notification message to the client tier, which is illustrated in FIG. 11. Another option is to log a message to a history log (on the Portal), and the alarm history log can then be queried using the Client interface. Yet another option is for the occurrence of an alarm condition to trigger a recording of all network metrics for a predetermined amount of time. For example, it may be necessary for an network administrator to closely monitor the response time of a data storage device. If the data storage device's response time doubles, for example, an alarm can be configured to alert the network administrator and trigger a metric recording for analysis at a later time. Any one of a number of other alarm "conditions" could be implemented, thereby providing timely notification of network problems and/or conditions to the network administrator via the client tier 50 or email notification.

While they have been described as separate and discreet functional modules, the portal tier 35 and the client tier 50 could alternatively be implemented within one device or software package. For example, a portable testing unit could be created that incorporated the functions of both the portal tier 35 and the client tier 50 into a laptop computer such that a network specialist could then utilize the laptop to analyze various SAN networks. The portable testing unit would also then be operatively connected to a data monitoring probe as previously described.

In contrast, separate portal tiers 35 can be located in different geographical locations, and interconnected with a single client tier 50 by way of a suitable communications channel. This would allow one client tier to monitor multiple SAN networks by simply disconnecting from one portal tier and connecting to another portal tier. This communications interface could even be placed on the Internet to facilitate simplified monitoring connections from anywhere in the world. Similarly, a Web (HTTP) interface can be provided to the Portal.

In yet another embodiment, the client tier 50 could be replaced by an application programming interface (API) such that third-party vendors could produce a suitable user interface to display various transaction specific attributes, as well as instantaneous event attributes, received via the secondary data. Any appropriate interface could be utilized, including a graphics-based or a text-based interface.

Figure 6:
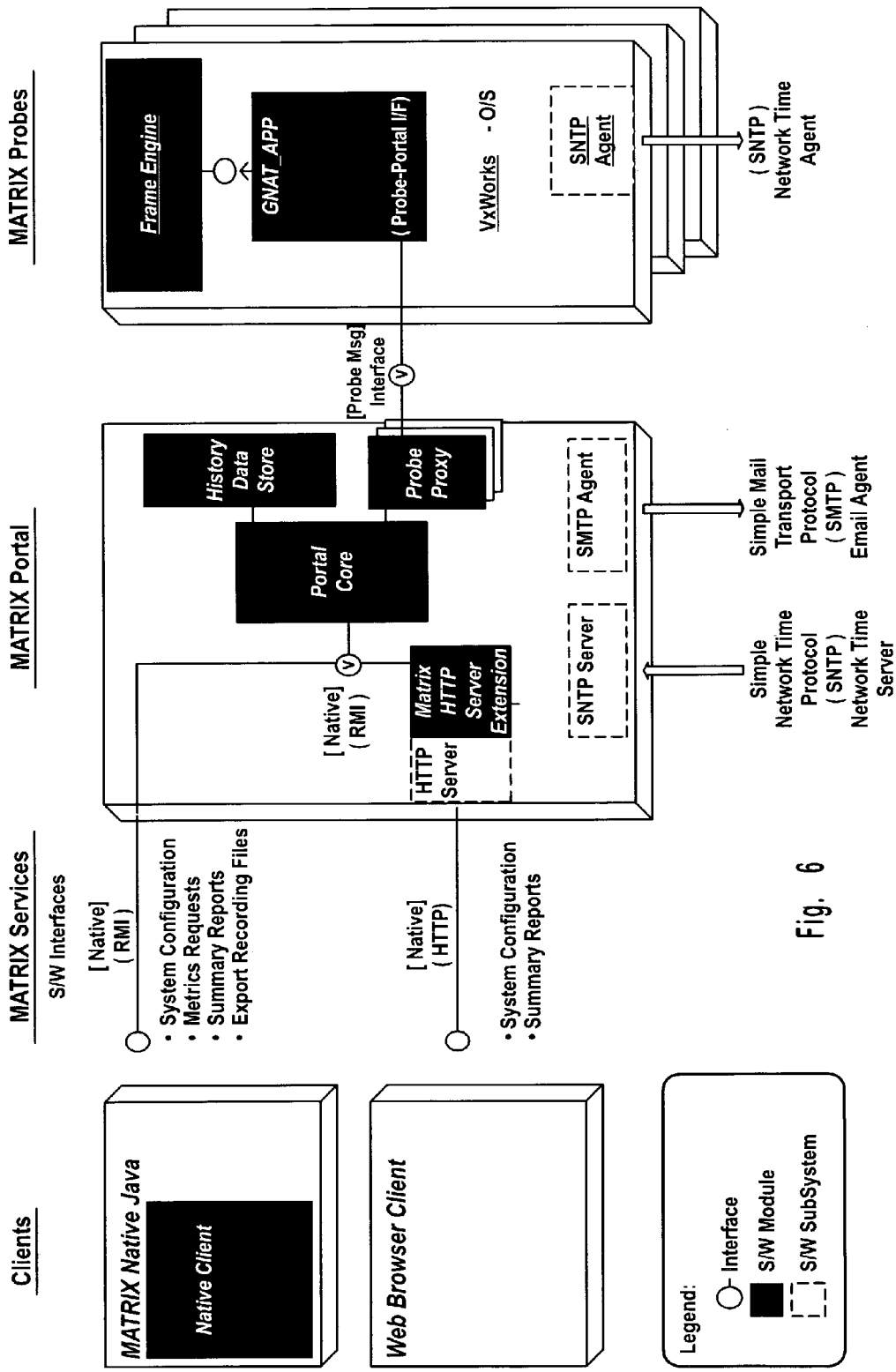
FIG. 6 illustrates a more detailed block diagram of one presently preferred method for transaction monitoring of a storage area network (SAN)
Figure 7:
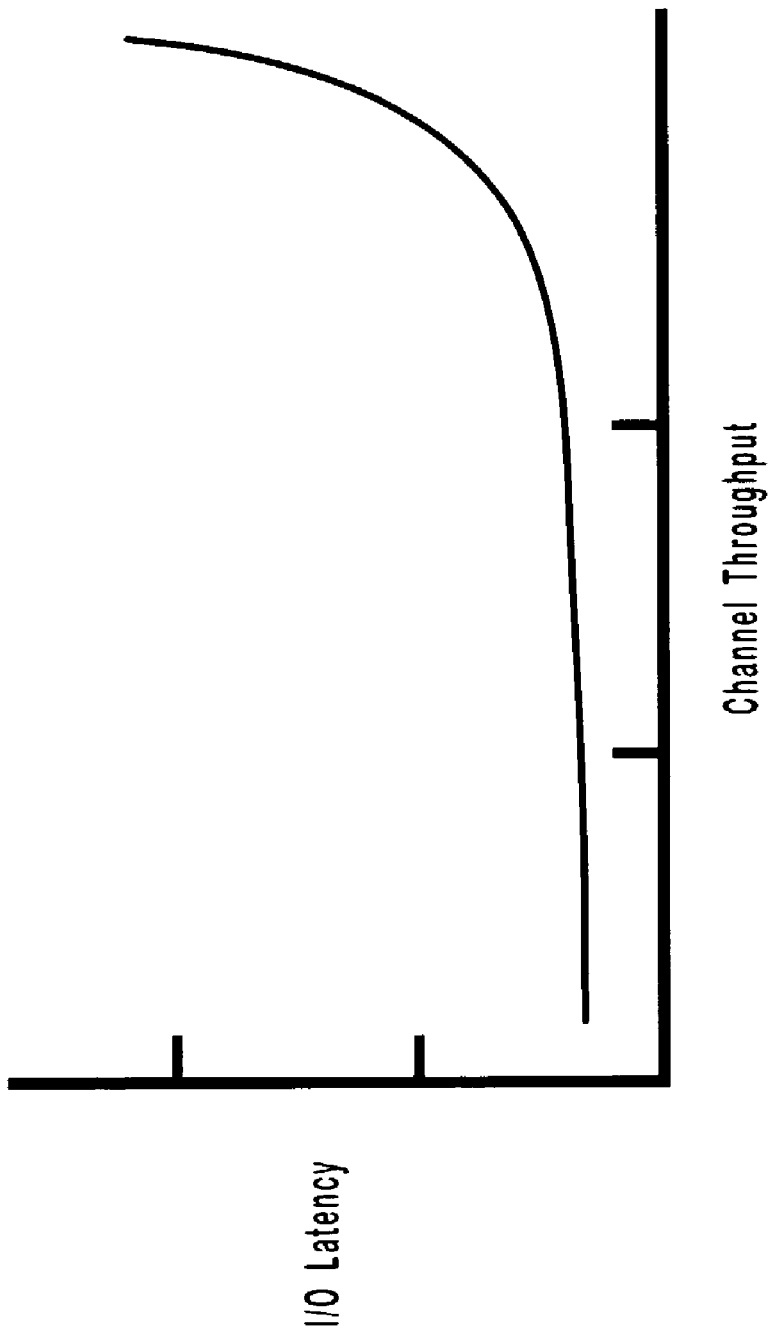
FIG. 7 illustrates a chart showing the relationship between throughput and latency in a shared channel storage I/O environment.

Reference is next made to FIG. 6, which illustrates a more detailed schematic of the data tier, portal tier and client tier. The various data communication interfaces between the tiers are illustrated to show one presently preferred embodiment of a method for transaction monitoring of a storage area network.

II. A Network Monitoring System Using Multiple "Heterogeneous" Probes

Note that while FIG. 1 shows only a single data flow 15 occurrence passing through to the data tier 20 via a probe 12, this is for purposes of illustration only. In a typical implementation, a plurality of probes, such as is represented as 12i-12n, would be connected at multiple locations within the network 10. Each probe would be positioned so as to monitor data flows at the different network locations, and thereby generate metrics representative of each of the multiple locations. Obviously, this provides a more comprehensive view of the operating status and configuration of the network, and results in a greater ability to detect and diagnose network problems.

It will be appreciated that a network monitoring system having multiple probes 12i-12n distributed throughout a network 10 can be implemented in different ways. For example, in one implementation, each of the probes 12i-12n may all be homogenous; that is, they may each be designed for a particular network protocol, and may each be implemented for detecting and outputting specific network attributes via metrics having a standard and common format for each probe. However, in this particular implementation, if one probe is changed such that the format of the metric also would change (e.g., a different probe type or version is installed), then each of the other probes would also have to be "globally" updated, so as to insure a consistent format of the metric data that is provided to the client applications. Alternatively, the client applications would have to be re-written so as to be compatible with the metric data format provided by the new probe type. As pointed out in the background section, these may not be satisfactory solutions.

In an alternative embodiment, the network monitoring system 100 is able to accommodate multiple probes 12i-12n that may be heterogeneous. As used herein, heterogeneous probes are defined as two or more probes that provide different and distinct metric data, whether the distinct metrics reflect different attributes of a common network protocol or whether the metrics reflect different attributes of distinct protocols. Thus, two different types of probes may be utilized within the monitoring system, even if they provide different metric data. This eliminates the need to utilize the same probes throughout a network monitoring system, or to provide global upgrades in the event that one of the probes are changed (for example to a different software version).

In this particular embodiment, each metric generated at a probe will contain probe "version" information. This probe version information can be used to determine what type of probe generated the corresponding metric, and thus what the format and type of information is actually contained within the metric.

Once the metrics are forwarded to the portal tier 35 as previously described, the portal tier 35 proceeds as described above. That is, it will organize the received metrics and reformat them into secondary data that can then be forwarded to the client tier 50. However, in this particular embodiment, the secondary data is in the form of a "data container" having a predefined format. In particular, the individual metrics are encapsulated into data containers, one example of which is designated at 160 in FIG. 1.

In general, a data container 160 contains fields for multiple metrics, as well as information about the format of the metrics that can be used by the client tier 50 to interpret the contents of the data container 160. For example, a single data container may contain an instantaneous event metric, such as megabytes per second, and a transaction I/O metric, such as a particular device's response time. FIG. 1A illustrates one presently preferred embodiment of the format of a data container 160. The illustrated data container 160 includes probe "version" information, such as probe version number field 165. This would indicate, for example, the exact type of probe that generated the metrics contained within the data container. In addition, the container 160 includes a protocol type field 170, which may indicate, for example, the particular protocol of the container—for example, Fibre Channel probe, or SCSI. Note that in some implementations, a probe may support multiple protocols, and thus provide multiple data container types (i.e., with different protocols). The data container may include yet additional descriptive information, depending on the particular requirements of the system. In a presently preferred embodiment, the container 160 further includes one or more metric information "fields," designated at 175*i*-175*n*. In general, examples of fields for SCSI metric type data may include 'frames/sec', 'number of check condition status frames', etc. The metric information fields 175 may further include a metric name field 180 (i.e., a specific identifier for the corresponding metric), a metric format field 185 (i.e., that indicates the specific format of the metric) and a metric data field 190 (i.e., the actual metric generated by the probe).

While a general format of a data container 160 has been provided, it will be appreciated that the concept can be extended to provide even further levels of functionality. For example, in addition to using the container to embed raw statistic metric type of data, the container can contain processor objects that provide the logic for supporting many different logical views of the metric data "on demand." Such functionality can be used to provide run-time "aggregation" and "derivation" of raw metric data into new fields. In a SCSI environment, aggregation capabilities may be used to generate such new fields as 'total counts by initiator independent of target/LUN', or other averages dependent on multiple other metrics. For example, in an exemplary embodiment, selected fields within a container are designated as "keys." Examples of key values for SCSI metrics would be 'initiator', 'target', and 'lun'. Such keys can be used in conjunction with metric processor objects to aggregate the raw statistic metric data into logical views at the client. For example, a client may request that a data container holding SCSI Initiator/Target/Lun statistics provide a processor object to "aggregate" all of the fields by the Initiator key. The portal will create the processor object within the container and provide it to the client via the predefined interface. The Initiator "view" at the client can then provide aggregated statistics for each of the fields for each Initiator requested. Also, once a processor object has been created, it can operate on multiple instances of the same data container type. This would be useful, for example, to clients that need to monitor a continuous stream of metrics from a particular logical view.

It will be appreciated that providing this type of functionality via processor objects defers the actual processing to the client tier platform (via the data containers). Consequently, the overall running system can avoid the processing necessary to support the many permutations of such derived or aggregated statistics unless those specific logical views are actually requested at the client. This greatly reduces the minimum requirements for processing resources in the probes, as well as the network bandwidth requirements for moving metric data throughout the monitoring system.

Moreover, by using such a data container having a standardized and predefined format, this encapsulation of the metric data within the data container insulates the client tier 50, or applications executing within the client tier, from having to be aware of different types of probes used within the network monitoring system, or the format of data that they are forwarding. Instead, the client applications can be implemented in a manner such that they rely on the use of the information embedded within the data container to manipulate the metric data contained therein, rather than using apriori knowledge of the data itself. Because the data container utilizes a standard and predefined format, the client tier 50 can translate the metric data in accordance with the defined format. Therefore, in the event that a single probe is upgraded to a different software version, or a new type of probe is introduced within the system, or a new network protocol is utilized, there is no need for a software rewrite or upgrade of the client software.

III. A Network Monitoring System Having Time-Synchronized Probes

Yet another difficulty introduced by the presence of multiple monitoring probes that are distributed throughout a network is the ability to obtain data in a synchronized fashion. In particular, for certain attributes of storage I/O transactions to be useful by a network administrator, the attributes must often be compared with similar attributes that have occurred elsewhere within the network. Obviously, the comparison must be of attributes that have occurred within the same time frame for the data to be of any use. Again, this type of synchronization is difficult, especially where there is large physical separation of probes. Given the high speeds of current SANs, even a small difference in probe clocks could give misleading information.

Thus, in yet another presently preferred embodiment, metric data obtained by different probes within a network is synchronized in time. In this way, the portal tier 35 can correlate the metric data with time to generate accurate monitoring data for the client tier. To do so, each probe provides the ability to mark the metrics generated with a "time-stamp." This time-stamp is then synchronized with respect to time-stamps for all other metrics from all other probes operating within the network.

Figure 2:
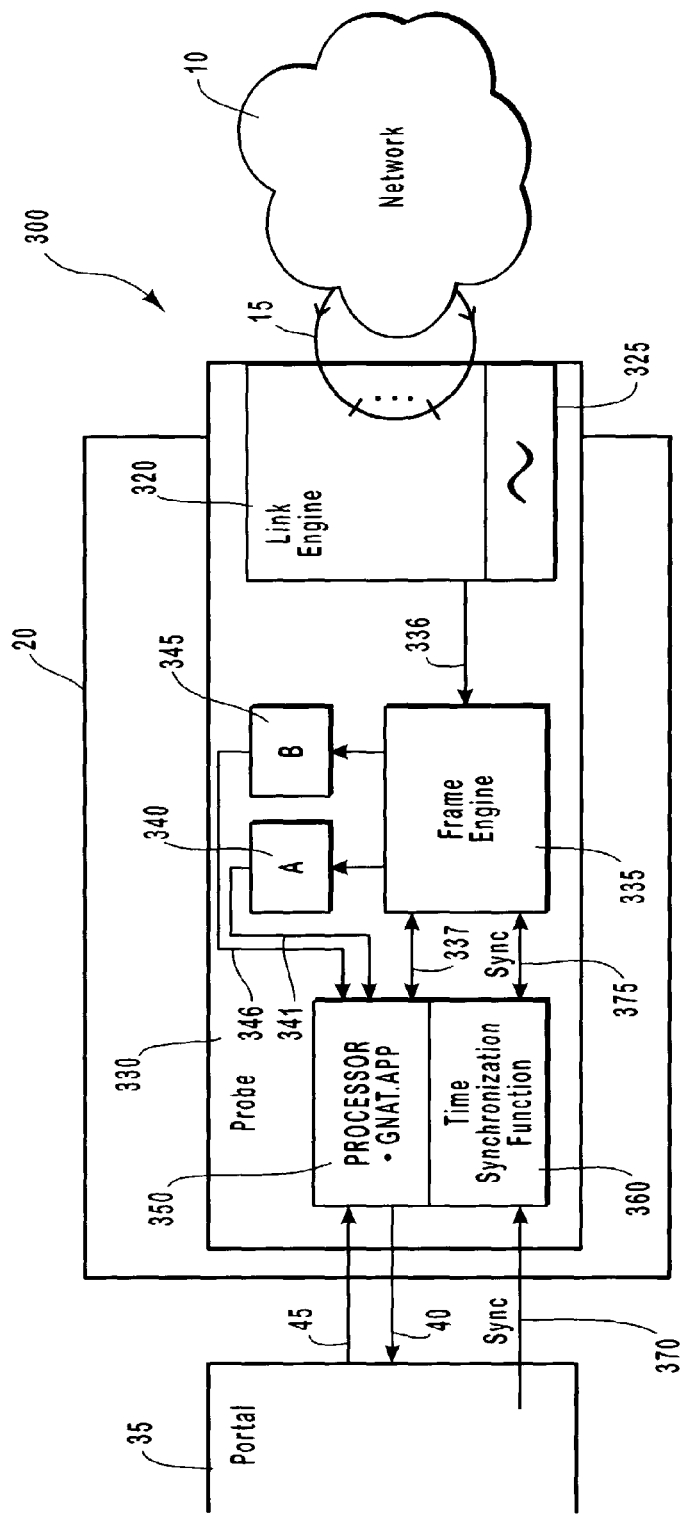
FIG. 2 illustrates a block diagram of another embodiment of a network monitoring device, or "probe," that can be used in conjunction with the method of transaction monitoring of FIG. 1.

Reference is next made to FIG. 2, which illustrates one presently preferred embodiment of the relevant portion of a network monitoring system 300 that is capable of synchronizing metric data received from multiple probes within a network, which is designated at 10. As previously described, the data tier 20 acquires an interval of network data 15 from the network 10 and then generates corresponding metrics within the probe 330.

In the illustrated embodiment, the probe 330 includes a link engine circuit, designated at 320. The link engine 320 provides several functions. First, it includes a network interface portion that provides an interface with the corresponding network 10 so as to permit receipt of the interval data 15. In addition, the link engine 320 retrieves the data stream interval 15 and restructures the retrieved data into a format more easily read by the frame engine logic 335 portion of the probe 330. For example, the link engine 320 drops redundant or useless network information present within the data interval, thereby insuring maximum processing efficiency by the probe 330 circuitry.

In the illustrated embodiment, the link engine 320 includes an additional functional component. This component is implemented so as to be capable of associating a time indicator, or "time-stamp" with the retrieved interval of data. For example, in a presently preferred embodiment, the link engine 320 includes an oscillator 325 for creating the time-stamp for the retrieved interval of data flow 15.

The copied data flow interval, along with its associated time-stamp, is then further analyzed by the probe 330 so as to create at least one descriptive metric, as previously described. In the exemplary embodiment the probe 330 includes a high speed processing circuit, as for example the illustrated "frame engine" 335. This circuit functions to receive the data intervals in substantially real time, and to create therefrom the corresponding descriptive metrics.

Again, the frame engine logic 335 is a high speed, network traffic processor that is capable of receiving an interval of data 15 from the network, and then processing and generating metric(s) containing attributes of the retrieved data. While other implementations could be used, in a preferred embodiment, the frame engine logic 335 is constructed in accordance with the teachings of the above referenced co-pending U.S.

application entitled "Synchronous Network Traffic Processor" and incorporated herein by reference.

Associated with the frame engine logic 335 is a first data storage bank 340 and a second data storage bank 345, which each provide high speed memory storage buffers. The probe 330 further includes a programmable processing device, such as an embedded processor 350. Associated with the processor 350 is internal memory, and data ports (not shown) for providing a high-speed control interface 337, and data interface 341, 346, with the frame engine circuit 335. Executing within the processor 350 is a functional component referred to herein as GNAT.APP. The GNAT.APP executes on processor 350 so as to control the above control interface between the processor 350 and the frame engine. In addition, the GNAP.APP application also functions to control the data interface between, and to control receipt of data metrics stored within buffer memories A 340 and B 345. The GNAT.APP function similarly coordinates the upload of data metrics to the portal tier 35, as is indicated via interface lines 45 and 40.

In operation, the frame engine 335 receives the time stamped data flow from the Link Engine 320 and creates at least one metric that includes attribute characteristics of that interval of data. However, instead of forwarding the created metric(s) directly to the portal tier 35, it is first buffered in one of the data banks A 340 or B 345. In operation, while one data bank outputs its metric contents to the GNAT.APP at processor 350 (e.g., via interface 341 or 346), the other data bank is being filled with a new metric by the frame engine 335. This process occurs in predetermined fixed time intervals; for example, in one preferred embodiment the interval is fixed at one second. Thus, while the frame engine 335 fills the first data bank 340, the second data bank 345 is emptying its contents to the GNAT.APP on processor 350.

In a presently preferred embodiment, the GNAT.APP function further includes a "time synchronization function" shown as 360 in FIG. 2. This function provides a component of the overall time synchronization of the probe with other probes.

In the preferred embodiment, the synchronization of metrics is performed by two general processes. The first time synchronization process causes the synchronization of each of the internal clocks of all of the probes within a network with the internal clock of the Portal 35 (not shown). In a presently preferred embodiment, this synchronization process, designated at 370, utilizes the standard network time protocol (NTP) as the communication protocol between the Portal 35 and the Probe 330. This process runs as long as the Portal is in communication with the Probe so that synchronization will not be lost to clock drift. The second time synchronization process is performed between the time synchronization function 360 executing on processor 350 and the Link Engine within each probe, via schematic 375.

As discussed above, the data banks A 340 and B 345 alternatively output their metric information to the GNAT.APP at one-second intervals. Of course, other time interval values could be used. At these one-second intervals, the time synchronization function 360 analyzes the time-stamp on the metric data from the outputting data bank in relation to the Probe's internal clock (i.e., synchronized to the Portal's internal clock by the first synchronization process 370). If the time-stamp indicates that the data is not substantially aligned with the one-second interval on the synchronized internal clock, the time synchronization function 360 adjusts the timing on the Link Engine 320 to synchronize the one-second intervals with the Probe's 330 internal clock, and by extension, the Portal's 35 internal clock. This allows all of the metric data created by each of the multiple probes within a network to be synchronized to the same one-second interval. Since the synchronization process is constantly evaluating each probe's one-second interval, periodic drift is prevented.

Figure 3:
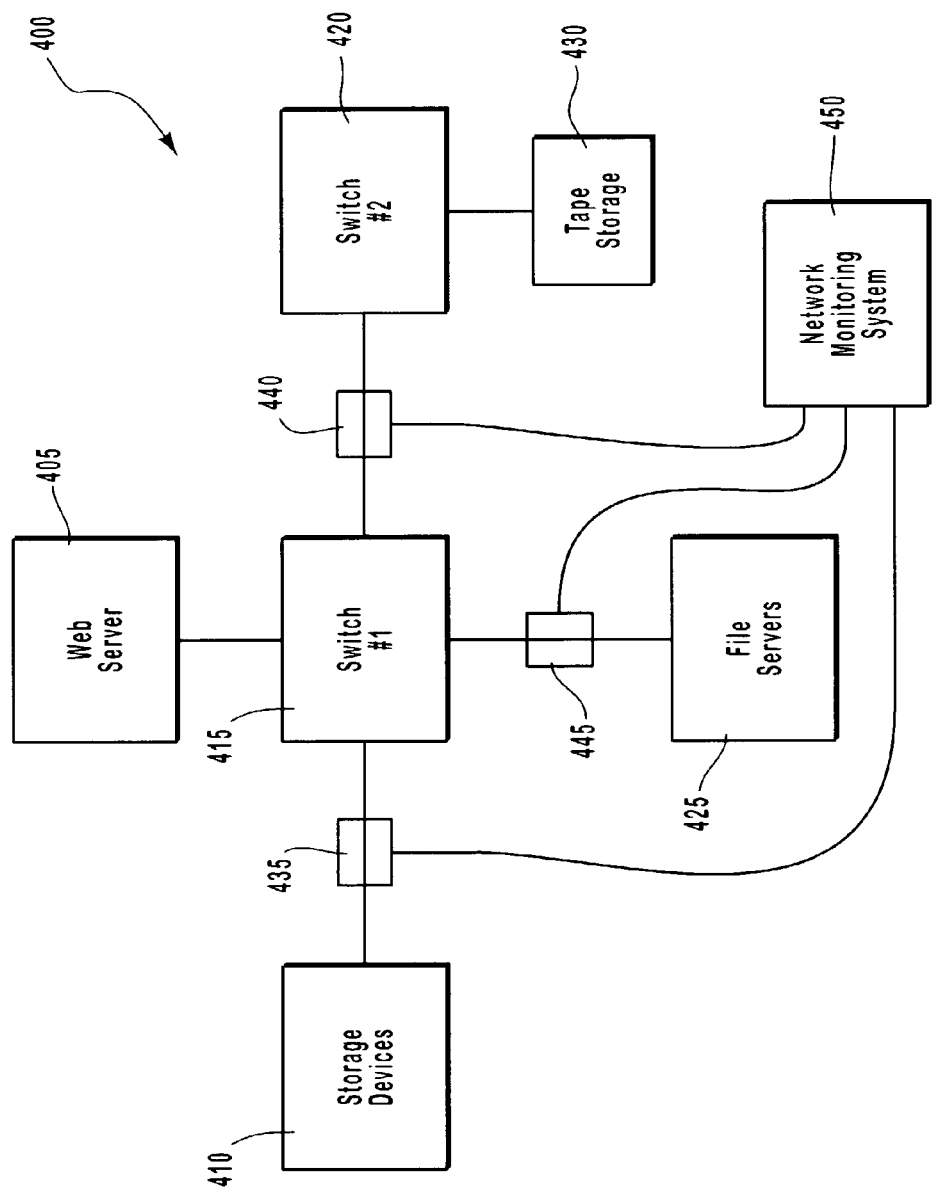
FIG. 3 illustrates a schematic diagram of a multi-device network in which multiple monitoring devices (probes) are positioned throughout the network so as to monitor the network data flow and that is utilizing the synchronization system and methodology illustrated in FIG. 2.

For example, in the environment of FIG. 3, multiple probes are positioned to accurately monitor the data transfer characteristics of the network as a whole. The synchronization process described in detail with reference to FIG. 2 can be utilized in this network to coordinate the network monitoring data from each of the probes. The multi-device network 400 includes a web server 405, a set of storage devices 410, two switches 415 420, a file server 425 and a tape storage device 430. All of these components are simply generic elements of a network which perform specific functions. Servers 405 and 425 generally process and route data, storage devices 410 and 430 store data on a particular medium, and switches route data based on a set of parameters. It is important to monitor networks such as this to determine if any one device is malfunctioning or causing inefficient transfers of data. The network monitoring system 450 monitors data from multiple probes 435, 440, 445 that are positioned at different locations within the network 400. As discussed above, the probes do not simply measure the throughput of the data at their particular location but instead measure transaction specific metrics regarding information that is passed at that point. For the network monitoring system 450 to accurately compare information gathered by each of the probes 435, 440, 445, the probes must be synchronized to the same time. The synchronization scheme described with reference to FIG. 2 is used to synchronize the probes 435, 440, 445 so as to accurately compare their data. For example, if the file servers 425 send information to the storage devices 410, the information will pass through two probes 445 and 435 and switch #1 415. If switch #1 is malfunctioning, it will corrupt or delay the data being transferred to the storage devices 410. If the network monitoring data received from the two probes 435, 445 is synchronized, it is possible to determine if the data has been altered or delayed en route to the storage devices 410. There are many scenarios in which synchronized data from multiple probes can be used to perform specialized network monitoring tasks that are otherwise impossible.

IV. Re-Programmable Network Probes

Figure 4:
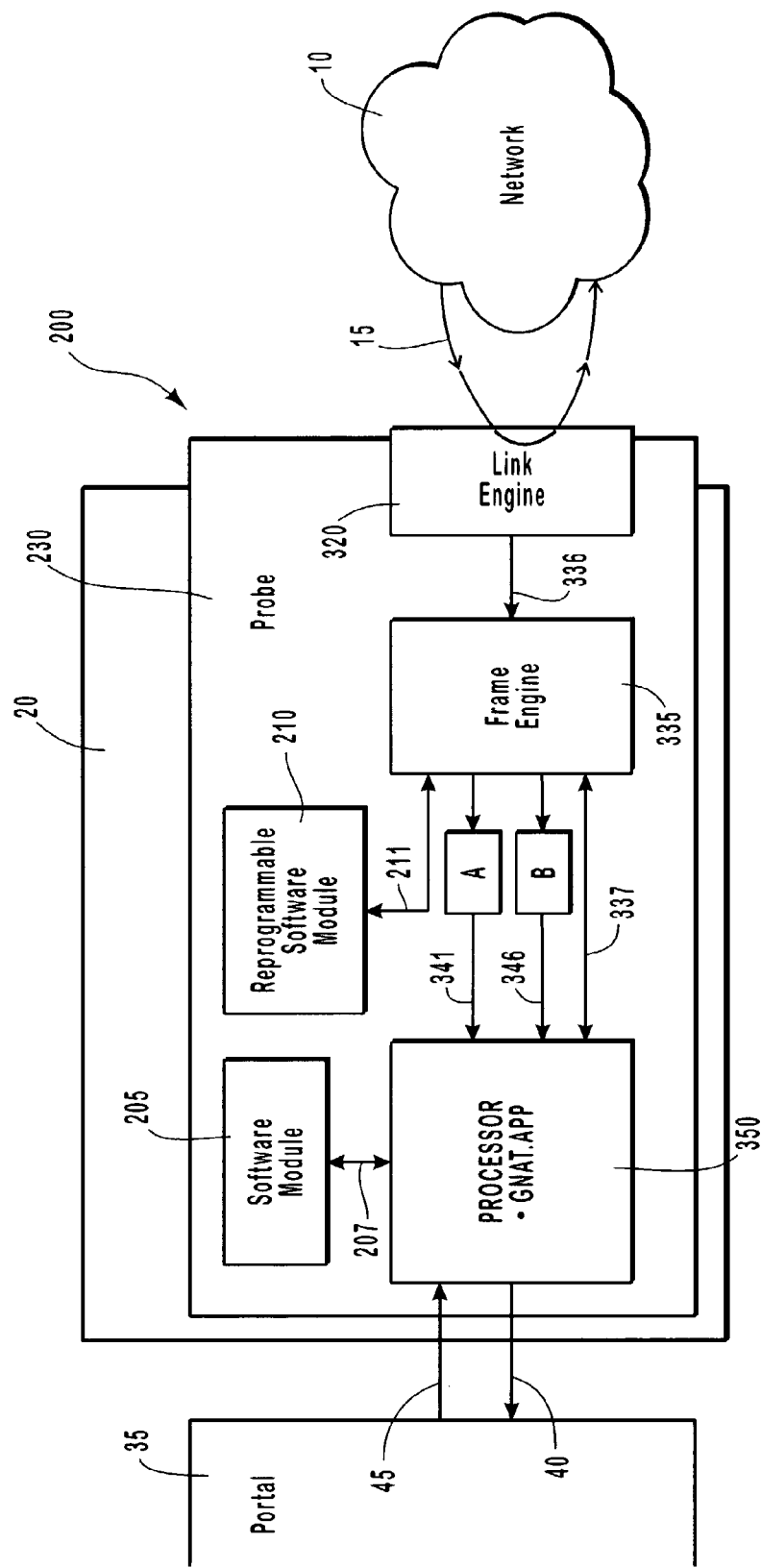
FIG. 4 illustrates a block diagram of yet another embodiment of a network monitoring device, or "probe," that can be used in conjunction with the method of transaction monitoring of FIG. 1.

Reference is next made to FIG. 4, which illustrates a schematic diagram of yet another probe implementation, designated generally at 200, that can be used by the data tier component of a network monitoring system. The probe 200 functions in generally the same fashion as previously described, in that it generates metric(s) that are derived from monitored intervals of network data designated as 15. The metrics, which are descriptive of I/O transaction attributes for example, are then forwarded by the probe to the portal tier 35 as previously described. However, in this particular embodiment the probe 200 is re-programmable. In particular, in the presently preferred embodiment, the probe 200 has the capability to be re-programmed in a manner so that it only forwards metric(s) for network data having a specific network protocol, such as Fibre Channel, Gigabit Ethernet, etc. In this way, a particular probe can be implemented for capturing and monitoring transaction level attributes for a protocol of interest, and ignoring transactions sent via other protocols. This provides a greater level of operating efficiency at the probe level, and also provides flexibility to the network monitoring system. In particular, re-programmability provides the ability to update the probe (with software) as network protocols evolve or to reprogram the probe for an entirely new protocol.

With continued reference to FIG. 4, illustrated is one presently preferred embodiment of the relevant portion of a network monitoring system 200 that utilizes a re-programmable probe 230 within a data tier 20. As previously described, the data tier 20, via the probe, acquires predetermined intervals of network data 15 from the network 10 and then generates corresponding metrics. In the illustrated embodiment, the probe 230 generally includes a link engine circuit, designated at 320 that is operably interconnected with a frame engine logic portion 335. Also included is programmable processor, such as an embedded processor 350, which has a corresponding software storage area designated as software module area 205. In addition, associated with the frame engine logic 335 is a re-programmable software module storage area 210.

By way of general overview, the link engine 320 provides several functions. First, it includes a network interface portion that provides an interface with the corresponding network 10 so as to permit receipt of the interval data 15. In addition, the link engine 320 retrieves the data stream interval 15 and restructures the retrieved data into a format more easily read by the frame engine logic 335 portion of the probe 230. For example, the link engine 320 drops redundant or useless network information present within the data interval and that is not needed by the frame engine to generate metrics. This insures maximum processing efficiency by the probe 230 circuitry and especially the frame engine circuit 335. In addition, the link engine can be configured to provide additional "physical layer"-type functions. For example, it can inform the frame engine when a "link-level" event has occurred. This would include, for example, an occurrence on the network that is not contained within actual network traffic. For example, if a laser fails and stops transmitting a light signal on the network, i.e., a "Loss of Signal" event, there is no network traffic, which could not be detected by the frame engine. However, the condition can be detected by the link engine, and communicated to the frame engine.

The copied data flow interval obtained by the link engine is then forwarded to the frame engine 335 as is schematically indicated at 336. The interval data is then further analyzed by the frame engine 335, which creates at least one descriptive metric. Again, in the exemplary embodiment the frame engine 335 is a high speed, network traffic processor that is capable of receiving an interval of data 15 from the network, and then processing and generating metric(s) containing attributes of the received data. While other implementations could be used, in a preferred embodiment, the frame engine logic 335 is constructed in accordance with the teachings of the above referenced co-pending U.S. application entitled "Synchronous Network Traffic Processor," which has been incorporated herein by reference.

In the illustrated embodiment, there is associated with the frame engine logic 335 a first data storage bank A and a second data storage bank B, which each provide high speed memory storage buffers. In general, the buffers are used as a means for storing, and then forwarding—at high speeds—metrics generated by the frame engine. Indeed, the dual nature of the storage buffers enables a high speed data transfer of the metrics. For example, in operation the frame engine 335 receives the intervals of network data from the Link Engine 320, and creates at least one metric that includes attribute characteristics of that interval of data. However, instead of forwarding the created metric(s) directly to the portal tier 35, it is first buffered in one of the data banks A or B. To increase the overall throughput, while one data bank outputs its metric contents to the GNAT.APP function of processor 350 (e.g., via interface 341 or 346), the other data bank is being filled with a new set of metric data created by the frame engine 335. This process occurs in predetermined fixed time intervals; for example, in one preferred embodiment the interval is fixed at one second.

As noted, in the particular embodiment of FIG. 4, the probe 230 has a re-programmable feature associated with it. This feature is enabled by way of the reprogrammable software module, designated at 210, which is operably interfaced with the frame engine 335 as indicated by interface line 211. This software module 210 contains a customized software application that controls the execution of the frame engine 335. In particular, the software module 210 contains an executable module that controls the manner in which a metric is derived by the frame engine 335. For example, it can be reprogrammed to adapt to the evolution of emerging network protocols, or to change/control the protocols to be monitored by the probe. Thus, by providing the module with different executables, different modes of operation can be obtained. In one presently preferred embodiment, the executable controls the network protocol for which metrics will be created. Thus, the frame engine 335 could be programmed to monitor only that network traffic for a particular protocol, such as Fibre Channel or Gigabit Ethernet. Alternatively, the re-programmable software module 210 could include instructions that enables the frame engine to track attributes of logical transactions that span multiple intervals and thereby record transaction response time metrics between two specific devices that are communicating. Of course, the reprogrammable aspect of the implementation permits for reconfiguration of the probe when, for example, and new protocol version is implemented. Also, the reprogrammability is not limited to network protocols metrics as implemented through module 210, non-metric related probe behaviors can also be re-programmed though module 205. For example, the probe could be implemented with differing access security mechanisms depending on the security requirements of the deployed environment.

V. Metric Creation from Fundamental Metrics

As has been previously discussed, probe units process all monitored network traffic at line-rate speeds, and then produce data—primarily statistical information referred to as metrics—that reflect key attributes of the monitored entity within the context of a particular protocol. At the request of the portal tier, this metric information is forwarded from the probe, where it is managed, processed and reformatted into a "secondary data" unit, which preferably is in the form of a predefined data container, previously described in Section II. These data containers are then provided to the client tier via a predefined interface, where the various metric and/or event information can be presented to a user, or otherwise manipulated in the context of a network monitoring facility.

As discussed, the preferred data container implementations can be used to present a variety of information depending on the needs of the particular network monitoring environment. In general, the container may contain fields for multiple metrics, as well as information about the format of the metric(s) that can be used by the client tier to interpret the contents of the data container. For example, the data container can include probe "version" information, indicative of the exact type of probe used to generate the metrics contained within the data container, as well as a container type field that indicates the type of metrics held in the container and generally includes information about the network protocol that was monitored to generate the metrics. The data container further include one or more metric information fields, indicative of a particular network attribute, such as 'frames/sec', 'number of check condition status frames', etc. These metric information fields may further include a metric name field (i.e., a specific identifier for the corresponding metric), a metric format field 185 (i.e., that indicates the specific format of the metric) and a metric data field 190 (i.e., the actual metric generated by the probe). Again, the specific format and content of the data container is not critical and will depend on the requirements of the monitoring system; however, the predefined and fixed format of the data container provides a consistent and known interface to the client tier that is independent of the exact type of probes used, and/or the specific format and type of data that is encapsulated within the data container.

In an alternative embodiment, the predefined nature of the data container can provide even additional functionality and advantages to the overall monitoring system. In particular, the format and functionality of the encapsulated data container can actually be utilized to defer (or eliminate) certain processing operations away from the probe and the portal tier, to the client tier. For example, in practice, any of a number of different metrics may be of interest to a client operating at the client tier. In normal operation, however, a client application may be interested in only a subset of all of the available metrics and, to the extent that the client application may be interested in certain metrics, those metrics may be needed less than continuously. Thus, although there may be exceptions, a given client application is interested in only a fraction of the total metrics that are available from the network. Of course, one approach to insure that client applications always have access to all of the metric information would be to deliver all metrics, regardless of the current needs of the client applications. However, this approach would quickly exhaust computational and communication resources—especially given the high operation speeds of the networks of interest and the permutations of metrics available.

Thus, in one presently preferred embodiment, in addition to using the container to embed raw statistic metric type of data, the container is used to also encapsulate "processor objects." Such processor objects provide the logic for supporting many different logical views of the metric data "on demand." Alternatively, they can be implemented to calculate derived metrics from certain fundamental metrics. Thus, the processor object provides convenient access to the derived metrics as well as aggregation views. Such functionality can thus be used to provide, for example, run-time "aggregation" and "derivation" of raw metric data into new fields. Thus, rather than supplying all metrics at all times to the client applications, the universe of metrics that are supported by the system is divided into two groups designated as "fundamental" and "derived." This is based on the observation that many metrics can be derived from other metrics and that some metrics require direct measurement of fundamental statistics associated with the network traffic and the data that is being monitored. In addition, the concept of "aggregation" refers to the operation of combining multiple metrics, whether fundamental or derived, into a single view that can be displayed to a user of a client application.

It will be appreciated that providing this type of functionality via processor objects defers the actual processing to the client tier platform (via the data containers). Consequently, the overall running system can avoid the processing necessary to support the many permutations of such derived or aggregated statistics unless those specific logical views are actually requested at the client. This greatly reduces the minimum requirements for processing resources in the probes, as well as the network bandwidth requirements for moving metric data throughout the monitoring system.

For purposes of example, in a SCSI environment, aggregation capabilities may be used to generate new types of "aggregation" fields such as "total counts by initiator independent of target/LUN" or other types of averages that are dependent on multiple other metrics. In one example, selected fields within a data container are designated as "keys." Examples of key values for SCSI metrics would be "initiator" (a device that initiates SCSI exchanges by sending SCSI commands to specific target/lun devices), "target" (a device that responds to SCSI commands issued by an initiator), and a "lun" (the Logical Unit Number (LUN) associated with a SCSI target). Such keys can be used in conjunction with metric processor objects to aggregate the raw statistic metric data into logical views at the client tier. By way of example, a client application may request that a data container holding SCSI Initiator/Target/Lun statistics provide a processor object to "aggregate" all of the fields by the Initiator key. In one embodiment, the portal tier will then create the processor object within the data container and provide it to the client via the predefined interface at the client tier. The Initiator "view" at the client application can then provide aggregated statistics for each of the fields for each Initiator requested. Also, once a processor object has been created, it can operate on multiple instances of the same data container type, thereby eliminating the need for re-creation of the objection. This would be useful, for example, to client applications that need to monitor a continuous stream of metrics from a particular logical view.

Figure 5A:
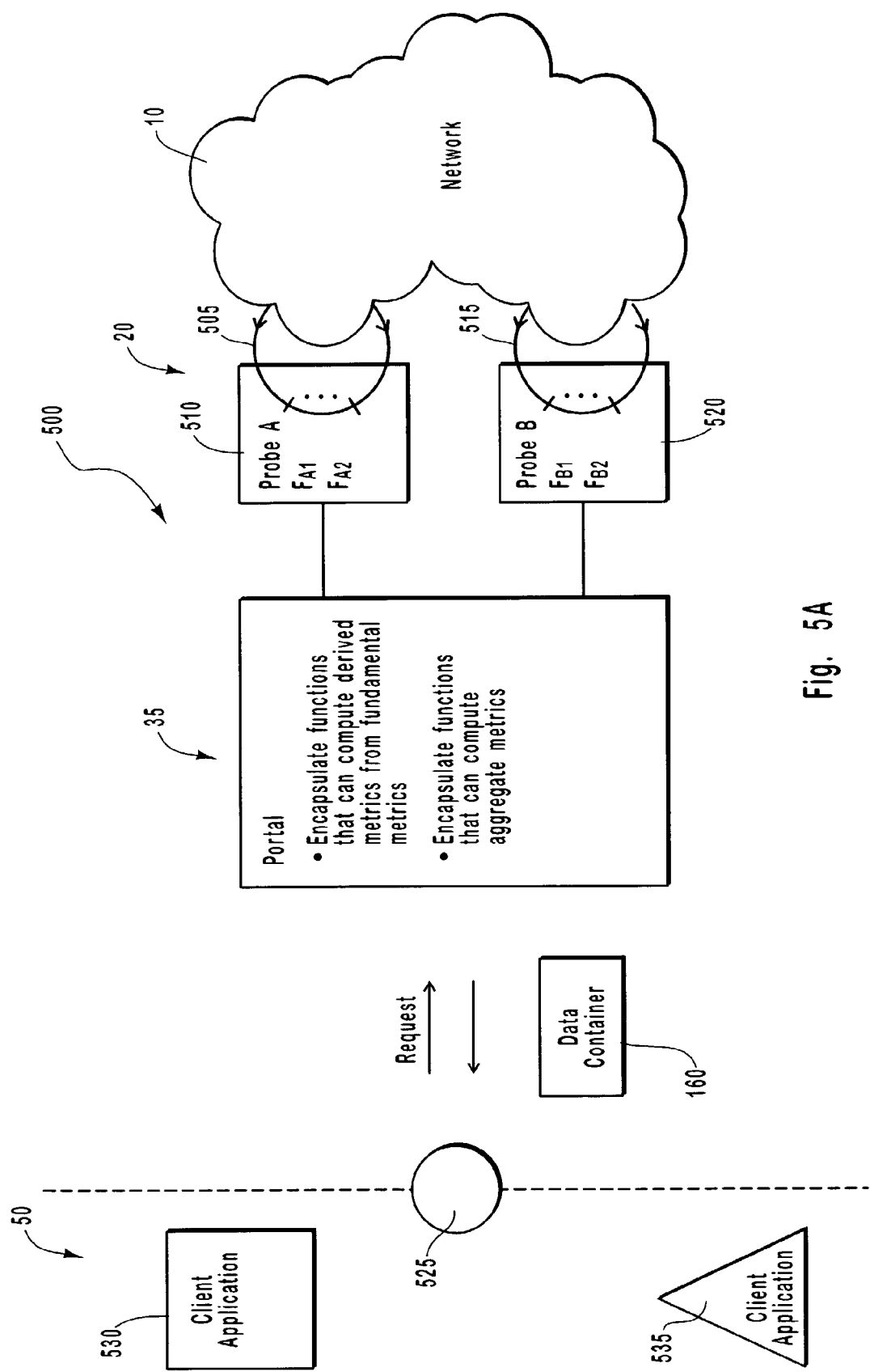
FIG. 5A is a functional block diagram of an embodiment of a network monitoring system that utilizes a fundamental/derived metric optimization scheme.
Figure 5B:
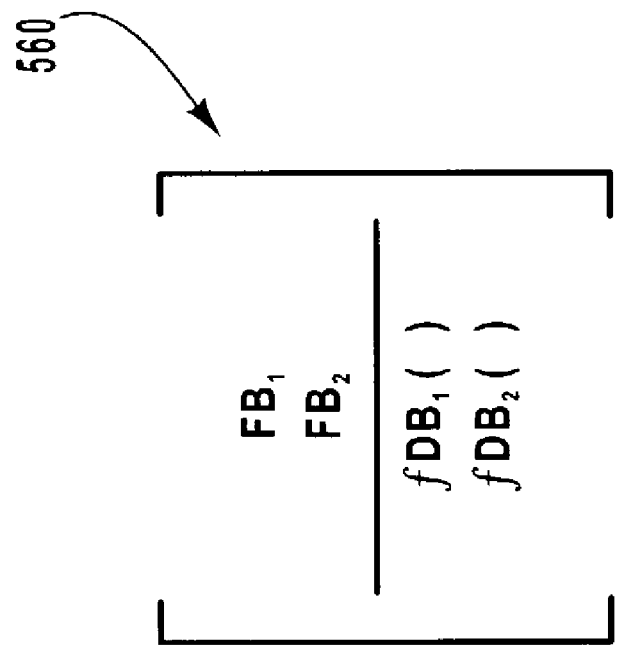
FIG. 5B illustrates abstract examples of data containers that include fundamental metric values and mathematical functions to calculate derived metrics.
Figure 5B:
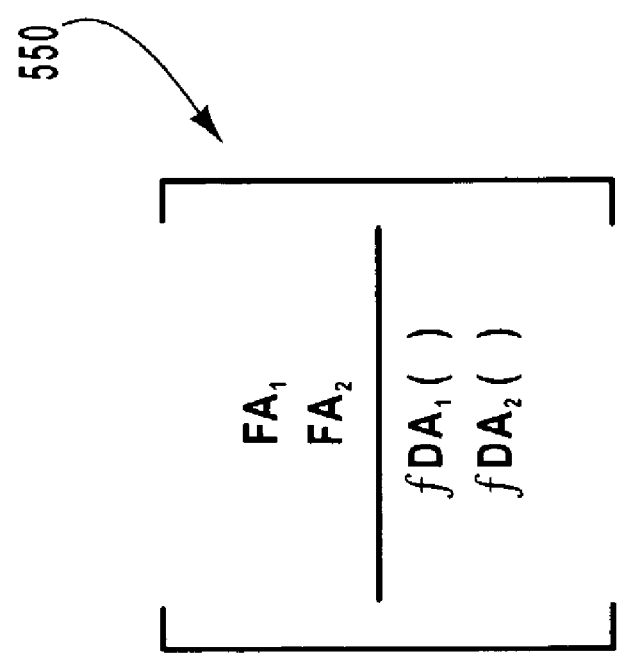

Reference is next made to FIGS. 5A and 5B, which together illustrate the use of processor objects within the data container to optimize and enhance the overall functionality of a network monitoring system. In this particular embodiment, the network monitoring system 500 is generally comprised of a client tier having a first client application 530 and a second client application 535, both of which are capable of operating on data containers received from a portal tier 35. In particular, the client applications 530 and 535 operate at the client tier 50, via a defined interface such as API 525. The portal tier 35 is then interfaced with a data source tier 20 having a set of data probes 510 and 520, which are is connected at different locations within the network 10.

As previously described, each of the probes 510, 520 continuously monitor intervals of data, designated at 505 and 515 respectively, and process the interval data to create a set of metrics (including events). However, in this particular embodiment, rather than monitoring for all available metric information, the probes only monitor and forward metrics that are classified as "fundamental." Depending on the particular application and networking environment, these fundamental metrics correspond to a set of metric data that can be mathematically manipulated so as to computationally generate other metrics. Of course, this need to only monitor and forward a subset of metrics greatly reduces the processing overhead at the probe level. Essentially, the probe can ignore certain aspects of the network traffic, thereby conserving probe processing resources.

The portal tier 35 requests and receives the fundamental metrics from the data tier probes 510 and 520, depending on the information requested by the client applications 530 and 535. The metrics are then organized, and preferably encapsulated into predefined data containers as previously described. However, as is generally shown in FIG. 5B, the actual content of the data container now can include the above-mentioned "processor object."

For example, in operation, Probe A generates fundamental metrics $FA_1$ and $FA_2$ from data flow 505. Likewise, Probe B 520 generates fundamental metrics $FB_1$ and $FB_2$ from data flow 515. In this particular example, Probe A and Probe B are different types of probes that generate different fundamental metric types. The probes 510 and 520 then transfer the fundamental metrics to the portal tier 35 in response to a request, as previously described.

In this illustrated embodiment, the processor object will function, based upon the request received from the client tier. The processor object is configured based on information provided within the data container and based on the type of aggregation (and/or derivation) requested by the client application. The data container (at the portal tier) sets up the processor object when the client requests it. Essentially, it is configured based on information in the container and information supplied in the client's request depending on the type of aggregation (and/or derivation) desired in the client. For example the portal tier will determine if a processor object is needed that functions to derive additional metric information from fundamental metrics that are contained within the data container, and will setup the container appropriately. Or, the processor module may function to provide an aggregation of the metric data contained within the data container. However, the execution of these aggregation and/or derivation processor objects does not actually occur at the portal tier 35. Instead, the actual execution of the processor objects occurs at the client tier 50 only if the corresponding aggregate data and/or derived metric(s) are requested by the client application.

This notion is also shown in FIG. 5B. There, the data containers 550 and 560 are generated in response to a request by a client application (e.g., 530, 535) for particular data. For example, the request by the client application can specify a time frame in which the metrics have been measured, a container type, and the network node (e.g., initiator or target node) that is of interest. Data container 550 includes fundamental metrics $FA_1$ and $FA_2$ that have been monitored by probe A 510, along with functions $fDA_1()$ and $fDA_2()$, which represent the metric derivation functions that will automatically be called if a derived metric is requested by a client. Functions $fDA_1()$ and $fDA_2()$ are processor objects that can be used to calculate derived metrics $DA_1$ and $DA_2$. Likewise, data container 560 includes fundamental metrics $FB_1$ and $FB_2$ that have been monitored by probe B 520, along with functions $fDB_1()$ and $fDB_2()$, which represent the metric derivation functions that can be used to calculate derived metrics $DB_1$ and $DB_2$. Of course, similar processor objects can be encapsulated that are capable of calculating an aggregation of metrics.

The data containers 550 and 560 are then provided to the client tier 50 via API 525. The processor objects described above in reference to FIG. 5B provide access to run-time derivation of the metrics that are not fundamental using the computational resources of the client tier 50. In addition, other functions can provide the logic for supporting many different logical views of the metric data at the client tier, thereby providing aggregation of the metric data.

Note that in FIG. 5B, it is implied that derivation functions, such as $fDA_1()$ and $fDA_2()$, are created at the portal tier 35 and then provided to the client tier 50. In another embodiment however, the relevant derivation functions and processor objects may already "reside" at the client tier 50, in which case the data container, instead of actually containing the entire processor object, may merely include the relevant metric data needed by the processor object. However, execution will still occur at the client tier 50, and the metric derivation and/or aggregation functions will be completely transparent to the client application.

While the identity of the derived and fundamental metrics can vary greatly depending on the nature of the network traffic and the needs of the client applications, one example involves a metric of the average time elapsed between a command from an initiator network node and the first data that is returned in response to the command from a target network node. In this case, the "average command to first data" metric is a derived metric, since it can be calculated based on more fundamental statistics associated with the network traffic. In particular, the fundamental metrics that are associated with the derived "average command to first data" metric include A) the number of read commands completed in a particular interval between the initiator node and the target node, and B) the total time elapsed between commands and subsequent first data for all of the commands between the initiator node and the target node during the interval.

The derivation function referenced in the data container in this example includes a formula for dividing metric B by metric A as these metrics are described above. When the "average command to first data" metric is needed by the client application, the appropriate data container is requested over the interface 525. The client tier 50 then obtains the metric from the data container that is received in response to the request, and it does so in a manner such that whether a metric is derived or fundamental is transparent to the client application.

By way of further example, two sequences of pseudo code listings are shown below to further illustrate the use of processor objects at the client tier.

Sample pseudo code listing A, shown below, illustrates an exemplary process, executing at the client tier, for obtaining specific metric information via data containers forwarded by the portal tier. In particular, this example illustrates one embodiment of how certain metrics are derived from fundamental metrics. Moreover, the example illustrates how the actual underlying process for calculating the derived metrics is transparent to the client application This particular example involves a Fibre Channel network running a SCSI upper level protocol, and results in the generation of a table for several metrics. Because there is no aggregation performed in this example, a row for each initiator, target, and lun that communicated in each monitored interval of network data is produced. Also, the example generates a table that includes multiple intervals of data because, in this particular example, the request to the portal returns an array of data containers with a container for each interval requested.

Sample pseudo code listing B, also shown below, illustrates an exemplary process, again executing at the client tier, for obtaining specific metric information via data containers forwarded by the portal tier. This particular example illustrates one embodiment of aggregation of metrics, whereby a table of metrics are generated. Again, the example illustrates how the actual underlying process for aggregating metrics is transparent to the client application. As above, this particular example involves a Fibre Channel network running a SCSI upper level protocol. Because there is aggregation, the example produces a row for each initiator that communicated in each interval. The target, and luns have been aggregated so that there are "total" values for what each initiator did in the particular interval. Also, the example generates a table that includes multiple intervals of data because, in this particular example, the request to the portal returns an array of data containers with a container for each interval requested.

---
PSEUDO CODE LISTING A
---

```
// Get the data container; Note this is the only command that actually communicates to the Portal Tier in this example
containers = probe.getStatsContainers("ScsiItl", beginTime, endTime)
//Get the container for the first interval in our time period
container = containers[0];
//Get an index to the "Read commands that have completed" -- This is a fundamental metric
reads = container.getStatsFieldInfo("ReadCmdsCompleted").getFieldIndex( );
//Get an index to the "Total command to first data metric"
//This metric is a derived from a fundamental metric that is hidden from the client
tcfd = container.getStatsFieldInfo("calcTimeFRDF").getFieldIndex( );
//Get an index to the "Average command to first data metric"
//This field is derived from the "Total command to first data" metric and the "Read commands that have completed" metric
acfd = container.getStatsFieldInfo("calcAveTimeFRDF").getFieldIndex( );
//Get an index for the initator, target, and lun metrics
init = container.getStatsFieldInfo("initiator").getFieldIndex( );
targ = container.getStatsFieldInfo("target").getFieldIndex( );
lun = container.getStatsFieldInfo("lun").getFieldIndex( );
//Print out headers for our table
println(" Initiator   Target   Lun   Total cmd to first data   Read cmds completed   Avg cmd to first data");
i = 0;
//Loop for all of the time intervals we got back earlier from the Portal
for(containers){
    //Gets a container for the next interval of data in our time period
    container = containers[i++];
    //Print out the data from the container
    j = 0;
    for(container.getTotalNumRecords( )){
        print(container.getIntField(j, init));       // Prints the initiator field
        print(container.getIntField(j, targ));       // Prints the target field
        print(container.getIntField(j, lun));        // Prints the lun field
        print(container.getIntField(j, tcfd));       // Prints the total command to first data field
        print(container.getIntField(j, reads));      // Prints the reads completed field
        print(container.getIntField(j++, acfd));     // Prints the average cmd to first data field
        println( );                                  //So we can start the next row in our table
    }
}
```

---
PSEUDO CODE LISTING B
---

```
//Get the data container from the Portal Tier for a time interval beginTime to endTime
//Note this is the only command that actually communicates to the Portal Tier in this example
containers = probe.getStatsContainers("ScsiItl", beginTime, endTime)
//The only key field for this example is initiator: The target and lun fields will be aggregated
keys = {"initiator"}
//Get a processor to aggregate the data
processor = containers[0].getAggregatedStats(keys);
//Get an index to the "Read commands that have completed" metric
reads = processor.getStatsFieldInfo("ReadCmdsCompleted").getFieldIndex( );
//Get an index to the "Total command to first data" metric
//This metric is derived from a fundamental metric that is hidden from the client
tcfd = processor.getStatsFieldInfo("calcTimeFRDF").getFieldIndex( );
//Get an index to the "Average command to first data" metric
//This field is derived from the "Total command to first data" metric and the "Read commands that have completed" metric
acfd = processor.getStatsFieldInfo("calcAveTimeFRDF").getFieldIndex( );
//Get an index for the initator
init = processor.getStatsFieldInfo("initiator").getFieldIndex( );
//Print out headers for our table
println(" Initiator   Total cmd to first data   Read cmds completed   Avg cmd to first data");
i = 0;
//Loop for all of the time intervals we got back earlier from the Portal
for(containers){
    //Load the data for the current interval into the processor
    processor.loadStats( containers[i++]);
    //Print out the data from the processor
    j = 0;
```

-continued

PSEUDO CODE LISTING B

```
for( processor.getNumRecords( ) ){
    print(processor.getIntField(j, init);      // Prints the initiator
    print(processor.getIntField(j, tcfd);      // Prints the total command to first data
    print(processor.getIntField(j, reads);     // Prints the reads completed
    print(processor.getIntField(j++, acfd);    // Prints the average cmd to first data
    println( );                //So we can start the next row in our table
}
}
```

Again, the functionality provided via such processor objects defers the actual processing to the client tier 50 (via the data containers). Consequently, the overall system can avoid the processing necessary to support the many permutations of derived or aggregated metrics unless those specific logical views are actually requested at the client tier. As noted, this greatly reduces the minimum requirements for processing resources in the probes and the portal tier, as well as the network bandwidth requirements for moving metric data throughout the monitoring system.

Moreover, by using such a data container having a standardized and predefined format, this encapsulation of the metric data within the data container insulates the client applications from having to be aware of different types of probes used within the network monitoring system, the format of the data, or the code of the processor objects used to obtain derived or aggregated metrics. Instead, the client application can be implemented in a manner such that it relies on the use of the information embedded within the data container to manipulate the metric data contained therein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for synchronized monitoring of traffic on a communications network, the system comprising:
    a plurality of data collection sources connected at predetermined connection points on the network, for generating a plurality of synchronized descriptors, the synchronized descriptors being representative of at least one characteristic of the network traffic traversing the corresponding connection point; wherein each of the data collection sources comprises:
        an internal clock,
        a time synchronization function for aligning a plurality of fixed time intervals,
        a plurality of data banks,
        a link engine for collecting a plurality of data intervals from traffic traversing the corresponding connection point during the fixed time intervals, and,
        a frame engine for generating the plurality of synchronized descriptors from the data intervals;
    wherein the link engine comprises an oscillator, distinct from the internal clock, that generates time-stamps;
    wherein the frame engine fills the data banks with the synchronized descriptors at the fixed time intervals,
    wherein the data banks output the synchronized descriptors at the fixed time intervals;
    wherein at the fixed time intervals, the time synchronization function analyzes time-stamps on the descriptors from an outputting data bank in relation to the internal clock,
    wherein when a time-stamp on a descriptor indicates that the descriptors are not aligned with the fixed time intervals according to the internal clock, the time synchronization function adjusts the timing of the oscillator to synchronize the fixed time intervals with the internal clock;
    a data portal connected to the plurality of data collection sources, the data portal comprising:
        a data portal clock for use by a synchronization process that causes synchronization of the internal clocks of the data collection sources with the data portal clock, thereby synchronizing the fixed time intervals of the plurality of data collection sources, and
        a secondary data generator for receiving the plurality of synchronized descriptors, and for generating a secondary data from the synchronized descriptors corresponding to a predetermined time interval; and,
    a monitoring client including:
        a communication interface configured to selectively request the secondary data, which correlates measurements simultaneously taken at the plurality of the data sources
        and to receive the secondary data formed of the data intervals collected at the plurality of data sources during the predetermined time interval, and
        a user interface capable of selectively displaying network information derived from the secondary data related to measurements taken at the plurality of data sources during the predetermined time interval.

2. The system as defined in claim 1, wherein the communications network includes a Storage Area Network (SAN).

3. The system as defined in claim 1, wherein the communications network utilizes an optical communications medium.

4. The system as defined in claim 1, wherein the communications network utilizes an electrical communications medium.

5. The system as defined in claim 1, wherein the descriptors contain at least one attribute of a storage I/O transaction communicated between at least two devices connected on the communications network.

6. The system as defined in claim 5, wherein the attribute is selected from at least one of the following transaction latency; response time; block transfer size; and transfer completion status.

7. The system as defined in claim 1, wherein the descriptors contain at least one attribute of an instantaneous event on the communications network.

8. The system as defined in claim 7, wherein the attribute is selected from at least one of the following: an error condition; and aggregate throughput.

9. The system as defined in claim 1, wherein a passive tap is interposed between at least one of the plurality of data collection sources and the communications network.

10. The system as defined in claim 1, wherein the data portal is implemented on a host computing device.

11. The system as defined in claim 1, wherein the monitoring client is implemented on a host computing device.

12. The system as defined in claim 1, wherein the data portal and the monitoring client are implemented on a single host computing device.

13. The system as defined in claim 1, wherein the plurality of descriptors are generated at substantially the same rate as the speed of the communications network.

14. The system as defined in claim 13, wherein the speed of the communications network is one gigabit per second or greater.

15. The system as defined in claim 1, wherein the communications network is a Fibre Channel network running a SCSI upper level protocol.

16. The system as defined in claim 1, wherein the data portal uses time stamps so as to identify the synchronized descriptors corresponding to the predetermined time interval for generating the secondary data therefrom.

17. The system as defined in claim 1, wherein the monitoring client is adapted to be remotely connected to the data portal.

18. The system as defined in claim 1, wherein a plurality of data containers are generated and stored at the data portal.

19. The system as defined in claim 1 wherein the monitoring client is implemented on the data portal.

20. The system as defined in claim 1, wherein one of the data bank outputs the synchronized descriptors concurrently with the frame engine filling another of the data banks.

* * * * *